United States Patent
Kim et al.

(10) Patent No.: US 12,528,881 B2
(45) Date of Patent: Jan. 20, 2026

(54) HUMANIZED ANTIBODY TO DIGOXIGENIN AND USES THEREOF

(71) Applicants: NATIONAL CANCER CENTER, Goyang-si (KR); JP BIO A INC., Seongnam-si (KR); KOOKMIN UNIVERSITY INDUSTRY ACADEMY COOPERATION FOUNDATION, Seoul (KR)

(72) Inventors: Yun Hee Kim, Goyang-si (KR); Kyun Heo, Seoul (KR); In Hoo Kim, Goyang-si (KR); Sun Il Choi, Goyang-si (KR)

(73) Assignees: NATIONAL CANCER CENTER, Goyang-si (KR); JP BIO A INC., Seongnam-si (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 513 days.

(21) Appl. No.: 18/043,469

(22) PCT Filed: Sep. 28, 2020

(86) PCT No.: PCT/KR2020/013221
§ 371 (c)(1),
(2) Date: Feb. 28, 2023

(87) PCT Pub. No.: WO2022/045433
PCT Pub. Date: Mar. 3, 2022

(65) Prior Publication Data
US 2024/0294671 A1     Sep. 5, 2024

(30) Foreign Application Priority Data
Aug. 28, 2020  (KR) .......................... 10-2020-0109727

(51) Int. Cl.
*C07K 16/44* (2006.01)
(52) U.S. Cl.
CPC .......... *C07K 16/44* (2013.01); *C07K 2317/24* (2013.01); *C07K 2317/565* (2013.01); *C07K 2317/92* (2013.01)
(58) Field of Classification Search
None
See application file for complete search history.

(56) References Cited

U.S. PATENT DOCUMENTS

| 6,180,370 B1 * | 1/2001 | Queen ..................... A61P 19/02 |
| | | 435/69.6 |
| 2013/0280279 A1 * | 10/2013 | Brinkmann ............. A61P 29/00 |
| | | 530/391.9 |

FOREIGN PATENT DOCUMENTS

| EP | 2 823 821 A1 | 1/2015 |
| KR | 10-2015-0030784 A | 3/2015 |

OTHER PUBLICATIONS

Kipriyanov, Sergey M., and Fabrice Le Gall. "Generation and production of engineered antibodies." Molecular biotechnology 26.1 (2004): 39-60. (Year: 2004).*
Janeway, Charles A. "Immunobiology: The Immune System in Health and Disease." 2001 (Year: 2001).*
Chen, Y.-P. et al., "Preparation of humanized anti-digoxin scFv and diabody", *Chinese Journal of Cellular and Molecular Immunology*, 2005, vol. 21, No. 6, 1 page.
NCBI, "anti-rabies virus immunoglobulin heavy chain variable region, partial [*Homo sapiens*]", GenBank accession No. AAY33194. 1, Jul. 26, 2016, 2 pages.
NCBI, "immunoglobulin heavy chain variable region, partial [Mus musculus]", GenBank accession No. AML31089.1, Mar. 10, 2016 2 pages.
NCBI, "IG c1241_light_IGKV2D-30_IGKJ2, partial [*Homo sapiens*]", GenBank accession No. QEP27363.I, Sep. 17, 2019, 2 pages.
NCBI, "immunoglobulin light chain variable region YM2-PPS-4-K4-31, partial [*Homo sapiens*]", GenBank accession No. ABC67041. 1, Jul. 26, 2016, 2 pages.
International Search Report mailed on May 21, 2021 in PCT/KR2020/013221 filed on Sep. 28, 2020 (3 pages).

* cited by examiner

*Primary Examiner* — Michael Szperka
*Assistant Examiner* — Lia E Taylor
(74) *Attorney, Agent, or Firm* — Oblon, McClelland, Maier & Neustadt, L.L.P.

(57) ABSTRACT

The present invention relates to humanized antibodies having good binding ability to digoxigenin and uses thereof. When an antibody or antigen-binding fragment thereof specifically recognizing digoxigenin according to one aspect of the present invention is used, the concentration of the drug in the body is adjusted as needed through a complex (DOligobody) containing the same, or the concentration of the drug in vivo It is expected that the half-life can be increased.

4 Claims, 11 Drawing Sheets

Specification includes a Sequence Listing.

|  | T ½ value (hr) |
|---|---|
| DOligomer | 0.02 |
| humab[21H8]-v5 DOligobody | 9.2 |
| humab[21H8]-v6 DOligobody | 16.8 |
| humab[21H8]-v8 DOligobody | 38.5 |

| | T ½ value (hr) |
|---|---|
| humab[21H8]-v5 DOligobody | 35 |
| humab[21H8]-v6 DOligobody | 32 |
| humab[21H8]-v8 DOligobody | 143 |

SEQUENCE LISTING

```
<160> NUMBER OF SEQ ID NOS: 40

<210> SEQ ID NO 1
<211> LENGTH: 121
<212> TYPE: PRT
<213> ORGANISM: Artificial Sequence
<220> FEATURE:
<223> OTHER INFORMATION: Mus musculus VH-m

<400> SEQUENCE: 1

Gln Val Thr Leu Lys Glu Ser Gly Pro Gly Ile Leu Gln Pro Ser Gln
1               5                   10                  15

Thr Leu Ser Leu Thr Cys Ser Leu Ser Gly Phe Ser Leu Thr Thr Ser
                20                  25                  30

Gly Met Gly Val Gly Trp Ile Arg Gln Ser Ser Gly Lys Gly Leu Glu
            35                  40                  45

Trp Leu Ala Asn Ile Trp Trp Tyr Asp Thr Lys Tyr Tyr Asn Ala Ala
        50                  55                  60

Leu Lys Ser Arg Leu Thr Ile Ser Lys Asp Thr Ser Lys Asn Gln Val
65                  70                  75                  80

Phe Leu Lys Ile Val Ser Val Asp Thr Ala Asp Thr Ala Thr Tyr Tyr
                85                  90                  95

Cys Gly Arg Ile His Tyr Asn Gly Ser Arg Phe Gly Asp Tyr Trp Gly
            100                 105                 110

Gln Gly Thr Thr Leu Thr Val Ser Ser
        115                 120

<210> SEQ ID NO 2
<211> LENGTH: 122
<212> TYPE: PRT
<213> ORGANISM: Artificial Sequence
<220> FEATURE:
<223> OTHER INFORMATION: Humanized VH-h1

<400> SEQUENCE: 2

Gln Val Thr Leu Lys Glu Ser Gly Pro Thr Leu Val Lys Pro Thr Gln
1               5                   10                  15

Thr Leu Thr Leu Thr Cys Thr Leu Ser Gly Phe Ser Leu Thr Thr Ser
                20                  25                  30

Gly Met Gly Val Gly Trp Ile Arg Gln Pro Pro Gly Lys Ala Leu Glu
            35                  40                  45

Trp Val Leu Ala Asn Ile Trp Trp Tyr Asp Thr Lys Tyr Tyr Asn Ala
        50                  55                  60

Ser Leu Lys Ser Arg Leu Thr Ile Thr Lys Asp Thr Ser Lys Asn Gln
65                  70                  75                  80
```

Val Val Leu Thr Met Thr Asn Met Asp Pro Val Asp Thr Ala Thr Tyr
            85                  90                  95

Tyr Cys Gly Arg Ile His Tyr Asn Gly Ser Arg Phe Gly Asp Tyr Trp
            100                 105                 110

Gly Gln Gly Thr Leu Val Thr Val Ser Ser
        115                 120

<210> SEQ ID NO 3
<211> LENGTH: 121
<212> TYPE: PRT
<213> ORGANISM: Artificial Sequence
<220> FEATURE:
<223> OTHER INFORMATION: Humanized VH-h2

<400> SEQUENCE: 3

Gln Ile Thr Leu Lys Glu Ser Gly Pro Thr Leu Val Lys Pro Thr Gln
1               5                   10                  15

Thr Leu Thr Leu Thr Cys Thr Leu Ser Gly Phe Ser Leu Thr Thr Ser
            20                  25                  30

Gly Met Gly Val Gly Trp Ile Arg Gln Pro Pro Gly Lys Ala Leu Glu
        35                  40                  45

Trp Leu Ala Asn Leu Trp Trp Tyr Asp Thr Lys Tyr Tyr Asn Ala Ser
    50                  55                  60

Leu Lys Ser Arg Leu Thr Ile Thr Lys Asp Thr Ser Lys Asn Gln Val
65                  70                  75                  80

Val Leu Thr Met Thr Asn Met Asp Pro Val Asp Thr Ala Thr Tyr Tyr
            85                  90                  95

Cys Gly Arg Leu His Tyr Asn Gly Ser Arg Phe Gly Asp Tyr Trp Gly
            100                 105                 110

Gln Gly Thr Leu Val Thr Val Ser Ser
        115                 120

<210> SEQ ID NO 4
<211> LENGTH: 121
<212> TYPE: PRT
<213> ORGANISM: Artificial Sequence
<220> FEATURE:
<223> OTHER INFORMATION: Humanized VH-h3

<400> SEQUENCE: 4

Gln Val Thr Leu Gln Glu Ser Gly Pro Gly Leu Val Lys Pro Ser Glu
1               5                   10                  15

Thr Leu Ser Leu Thr Cys Thr Leu Ser Gly Phe Ser Leu Thr Thr Ser
            20                  25                  30

Gly Met Gly Val Gly Trp Ile Arg Gln Pro Pro Gly Lys Gly Leu Glu
        35                  40                  45

Trp Leu Ala Asn Ile Trp Trp Tyr Asp Thr Lys Tyr Tyr Asn Ala Ser
    50                  55                  60

Leu Lys Ser Arg Val Thr Ile Ser Lys Asp Thr Ser Lys Asn Gln Val
65                  70                  75                  80

Ser Leu Lys Leu Ser Ser Val Thr Ala Ala Asp Thr Ala Val Tyr Tyr
            85                  90                  95

Cys Gly Arg Ile His Tyr Asn Gly Ser Arg Phe Gly Asp Tyr Trp Gly
            100                 105                 110

Gln Gly Thr Leu Val Thr Val Ser Ser
        115                 120

<210> SEQ ID NO 5

<211> LENGTH: 121
<212> TYPE: PRT
<213> ORGANISM: Artificial Sequence
<220> FEATURE:
<223> OTHER INFORMATION: Humanized VH-h4

<400> SEQUENCE: 5

Gln Val Gln Leu Gln Glu Ser Gly Pro Gly Leu Val Lys Pro Ser Glu
1               5                   10                  15

Thr Leu Ser Leu Thr Cys Thr Leu Ser Gly Phe Ser Leu Thr Thr Ser
            20                  25                  30

Gly Met Gly Val Gly Trp Ile Arg Gln Pro Pro Gly Lys Gly Leu Glu
        35                  40                  45

Trp Ile Ala Asn Ile Trp Trp Tyr Asp Thr Lys Tyr Tyr Asn Ala Ser
    50                  55                  60

Leu Lys Ser Arg Val Thr Ile Ser Lys Asp Thr Ser Lys Asn Gln Val
65                  70                  75                  80

Ser Leu Lys Leu Ser Ser Val Thr Ala Ala Asp Thr Ala Val Tyr Tyr
                85                  90                  95

Cys Gly Arg Ile His Tyr Asn Gly Ser Arg Phe Gly Asp Tyr Trp Gly
            100                 105                 110

Gln Gly Thr Leu Val Thr Val Ser Ser
        115                 120

<210> SEQ ID NO 6
<211> LENGTH: 111
<212> TYPE: PRT
<213> ORGANISM: Artificial Sequence
<220> FEATURE:
<223> OTHER INFORMATION: Mus musculus VL-m

<400> SEQUENCE: 6

Asp Val Val Met Thr Gln Thr Pro Leu Thr Leu Ser Val Thr Phe Gly
1               5                   10                  15

Gln Pro Ala Ser Ile Ser Cys Lys Ser Ser Gln Ser Leu Leu Tyr Thr
            20                  25                  30

Asn Gly Lys Thr Tyr Leu Met Trp Leu Leu Gln Arg Pro Gly Gln Ser
        35                  40                  45

Pro Lys Arg Leu Ile Tyr Leu Val Ser Thr Leu Asp Ser Gly Val Pro
    50                  55                  60

Gly Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Leu Thr Ile
                85                  90                  95

His Phe Pro Tyr Ser Phe Gly Gly Gly Thr Lys Leu Glu Ile Lys
            100                 105                 110

<210> SEQ ID NO 7
<211> LENGTH: 112
<212> TYPE: PRT
<213> ORGANISM: Artificial Sequence
<220> FEATURE:
<223> OTHER INFORMATION: Humanized VL-h1

<400> SEQUENCE: 7

Asp Val Val Met Thr Gln Ser Pro Leu Ser Leu Pro Val Thr Leu Gly
1               5                   10                  15

Gln Pro Ala Ser Ile Ser Cys Arg Ser Ser Gln Ser Leu Leu Tyr Thr
            20                  25                  30

Asn Gly Lys Thr Tyr Leu Met Trp Leu Gln Gln Arg Pro Gly Gln Ser
            35                  40                  45

Pro Arg Arg Leu Ile Tyr Leu Val Ser Thr Leu Asp Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Val Gly Val Tyr Tyr Cys Leu Gln Thr
                85                  90                  95

Thr His Phe Pro Tyr Ser Phe Gly Gln Gly Thr Lys Leu Glu Ile Lys
                100                 105                 110

<210> SEQ ID NO 8
<211> LENGTH: 112
<212> TYPE: PRT
<213> ORGANISM: Artificial Sequence
<220> FEATURE:
<223> OTHER INFORMATION: Humanized VL-h2

<400> SEQUENCE: 8

Asp Val Val Met Thr Gln Ser Pro Leu Ser Leu Pro Val Thr Leu Gly
 1                   5                  10                  15

Gln Pro Ala Ser Ile Ser Cys Arg Ser Ser Gln Ser Leu Leu Tyr Thr
                20                  25                  30

Asn Gly Lys Thr Tyr Leu Met Trp Leu Gln Gln Arg Pro Gly Gln Ser
            35                  40                  45

Pro Arg Arg Leu Ile Tyr Leu Val Ser Thr Trp Asp Ser Gly Val Pro
 50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Val Gly Val Tyr Tyr Cys Leu Gln Thr
                85                  90                  95

Thr His Phe Pro Tyr Ser Phe Gly Gln Gly Thr Lys Leu Glu Ile Lys
                100                 105                 110

<210> SEQ ID NO 9
<211> LENGTH: 112
<212> TYPE: PRT
<213> ORGANISM: Artificial Sequence
<220> FEATURE:
<223> OTHER INFORMATION: Humanized VL-h3

<400> SEQUENCE: 9

Asp Val Val Met Thr Gln Ser Pro Asp Ser Leu Ala Val Ser Leu Gly
 1                   5                  10                  15

Glu Arg Ala Thr Ile Asn Cys Lys Ser Ser Gln Ser Leu Leu Tyr Thr
                20                  25                  30

Asn Gly Lys Thr Tyr Leu Met Trp Leu Gln Gln Lys Pro Gly Gln Pro
            35                  40                  45

Pro Lys Arg Leu Ile Tyr Leu Val Ser Thr Leu Asp Ser Gly Val Pro
 50                  55                  60

Asp Arg Phe Ser Gly Ser Gly Ser Gly Thr Asp Phe Thr Leu Thr Ile
 65                  70                  75                  80

Ser Ser Leu Gln Ala Glu Asp Val Ala Val Tyr Tyr Cys Leu Gln Thr
                85                  90                  95

Thr His Phe Pro Tyr Ser Phe Gly Gln Gly Thr Lys Leu Glu Ile Lys
                100                 105                 110

<210> SEQ ID NO 10

```
<211> LENGTH: 112
<212> TYPE: PRT
<213> ORGANISM: Artificial Sequence
<220> FEATURE:
<223> OTHER INFORMATION: Humanized VL-h4

<400> SEQUENCE: 10

Asp Val Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Tyr Thr
            20                  25                  30

Asn Gly Lys Thr Tyr Leu Met Trp Leu Gln Gln Lys Pro Gly Gln Pro
        35                  40                  45

Pro Lys Arg Leu Ile Tyr Leu Val Ser Thr Arg Asp Ser Gly Val Pro
    50                  55                  60

Asp Arg Phe Ser Gly Ser Gly Ser Gly Thr Asp Phe Thr Leu Thr Ile
65                  70                  75                  80

Ser Ser Leu Gln Ala Glu Asp Val Ala Val Tyr Tyr Cys Leu Gln Thr
                85                  90                  95

Thr His Phe Pro Tyr Ser Phe Gly Gln Gly Thr Lys Leu Glu Ile Lys
            100                 105                 110

<210> SEQ ID NO 11
<211> LENGTH: 32
<212> TYPE: DNA
<213> ORGANISM: Artificial Sequence
<220> FEATURE:
<223> OTHER INFORMATION: internal 2'-O-methyl-modified aptamer SQ7-1(8)
<220> FEATURE:
<223> OTHER INFORMATION: internal 2'-O-methyl-modified aptamers (from 1
      to 4 and 29 to 32)
<220> FEATURE:
<221> NAME/KEY: modified_base
<222> LOCATION: (1)..(4)
<223> OTHER INFORMATION: 2'-O-methyl-modified bases from 1 to 4
<220> FEATURE:
<221> NAME/KEY: modified_base
<222> LOCATION: (29)..(32)
<223> OTHER INFORMATION: 2'-O-methyl-modified bases from 29 to 32

<400> SEQUENCE: 11
guuggtatat acttctttag cttggaacca ac                           32

<210> SEQ ID NO 12
<211> LENGTH: 80
<212> TYPE: DNA
<213> ORGANISM: Artificial Sequence
<220> FEATURE:
<223> OTHER INFORMATION: DNA aptamer SQ7

<400> SEQUENCE: 12
agcagcacag aggtcagatg atgttggtat atacttcttt agcttggaac caactcttgc    60
cctatgcgtg ctaccgtgaa                                                80

<210> SEQ ID NO 13
<211> LENGTH: 32
<212> TYPE: DNA
<213> ORGANISM: Artificial Sequence
<220> FEATURE:
<223> OTHER INFORMATION: DNA aptamer SQ7-1

<400> SEQUENCE: 13
gttggtatat acttctttag cttggaacca ac                           32
```

```
<210> SEQ ID NO 14
<211> LENGTH: 32
<212> TYPE: DNA
<213> ORGANISM: Artificial Sequence
<220> FEATURE:
<223> OTHER INFORMATION: internal 2'-O-methyl-modified aptamer SQ7-1(1)
<220> FEATURE:
<223> OTHER INFORMATION: internal 2'-O-methyl-modified aptamers (from 1
      to 6)

<400> SEQUENCE: 14
guugguatat acttctttag cttggaacca ac                                   32

<210> SEQ ID NO 15
<211> LENGTH: 32
<212> TYPE: DNA
<213> ORGANISM: Artificial Sequence
<220> FEATURE:
<223> OTHER INFORMATION: internal 2'-O-methyl-modified aptamer SQ7-1(2)
<220> FEATURE:
<223> OTHER INFORMATION: internal 2'-O-methyl-modified aptamers (from 7
      to 11)
<220> FEATURE:
<221> NAME/KEY: modified_base
<222> LOCATION: (7)..(11)
<223> OTHER INFORMATION: 2'-O-methyl-modified bases from 7 to 11

<400> SEQUENCE: 15
gttggtauau acttctttag cttggaacca ac                                   32

<210> SEQ ID NO 16
<211> LENGTH: 32
<212> TYPE: DNA
<213> ORGANISM: Artificial Sequence
<220> FEATURE:
<223> OTHER INFORMATION: internal 2'-O-methyl-modified aptamer SQ7-1(3)
<220> FEATURE:
<223> OTHER INFORMATION: internal 2'-O-methyl-modified aptamers (from 14
      to 18)
<220> FEATURE:
<221> NAME/KEY: modified_base
<222> LOCATION: (14)..(18)
<223> OTHER INFORMATION: 2'-O-methyl-modified bases from 14 to 18

<400> SEQUENCE: 16
gttggtatat actucuuuag cttggaacca ac                                   32

<210> SEQ ID NO 17
<211> LENGTH: 32
<212> TYPE: DNA
<213> ORGANISM: Artificial Sequence
<220> FEATURE:
<223> OTHER INFORMATION: internal 2'-O-methyl-modified aptamer SQ7-1(4)
<220> FEATURE:
<223> OTHER INFORMATION: internal 2'-O-methyl-modified aptamer (from 21
      to 26)
<220> FEATURE:
<221> NAME/KEY: modified_base
<222> LOCATION: (21)..(26)
<223> OTHER INFORMATION: 2'-O-methyl-modified bases from 21 to 26

<400> SEQUENCE: 17
gttggtatat acttctttag cuuggaacca ac                                   32

<210> SEQ ID NO 18
<211> LENGTH: 32
<212> TYPE: DNA
<213> ORGANISM: Artificial Sequence
<220> FEATURE:
<223> OTHER INFORMATION: internal 2'-O-methyl-modified aptamer SQ7-1(5)
<220> FEATURE:
```

```
<223> OTHER INFORMATION: internal 2'-O-methyl-modified aptamers (from 27
      to 32)
<220> FEATURE:
<221> NAME/KEY: modified_base
<222> LOCATION: (27)..(32)
<223> OTHER INFORMATION: 2'-O-methyl-modified bases from 27 to 32

<400> SEQUENCE: 18
gttggtatat acttctttag cttggaacca ac                                      32

<210> SEQ ID NO 19
<211> LENGTH: 32
<212> TYPE: DNA
<213> ORGANISM: Artificial Sequence
<220> FEATURE:
<223> OTHER INFORMATION: internal 2'-O-methyl-modified aptamer SQ7-1(6)
<220> FEATURE:
<223> OTHER INFORMATION: internal 2'-O-methyl-modified aptamers (from 7
      to 26)
<220> FEATURE:
<221> NAME/KEY: modified_base
<222> LOCATION: (7)..(26)
<223> OTHER INFORMATION: 2'-O-methyl-modified bases from 7 to 26

<400> SEQUENCE: 19
gttggtauau acuucuuuag cuuggaacca ac                                      32

<210> SEQ ID NO 20
<211> LENGTH: 32
<212> TYPE: DNA
<213> ORGANISM: Artificial Sequence
<220> FEATURE:
<223> OTHER INFORMATION: internal 2'-O-methyl-modified aptamer
      SQ7-1(1,5)
<220> FEATURE:
<223> OTHER INFORMATION: internal 2'-O-methyl-modified aptamers (from 1
      to 6 and 27 to 32)
<220> FEATURE:
<221> NAME/KEY: modified_base
<222> LOCATION: (1)..(6)
<223> OTHER INFORMATION: 2'-O-methyl-modified bases from 1 to 6
<220> FEATURE:
<221> NAME/KEY: modified_base
<222> LOCATION: (27)..(32)
<223> OTHER INFORMATION: 2'-O-methyl-modified bases from 27 to 32

<400> SEQUENCE: 20
guugguatat acttctttag cttggaacca ac                                      32

<210> SEQ ID NO 21
<211> LENGTH: 32
<212> TYPE: DNA
<213> ORGANISM: Artificial Sequence
<220> FEATURE:
<223> OTHER INFORMATION: internal 2'-O-methyl-modified aptamer SQ7-1(7)
<220> FEATURE:
<223> OTHER INFORMATION: Artificial Sequence
<220> FEATURE:
<221> NAME/KEY: modified_base
<222> LOCATION: (1)..(5)
<223> OTHER INFORMATION: 2'-O-methyl-modified bases from 1 to 5
<220> FEATURE:
<221> NAME/KEY: modified_base
<222> LOCATION: (27)..(32)
<223> OTHER INFORMATION: 2'-O-methyl-modified bases from 27 to 32

<400> SEQUENCE: 21
guuggtatat acttctttag cttggaacca ac                                      32

<210> SEQ ID NO 22
<211> LENGTH: 32
```

```
<212> TYPE: DNA
<213> ORGANISM: Artificial Sequence
<220> FEATURE:
<223> OTHER INFORMATION: internal 2'-O-methyl-modified aptamer SQ7-1(9)
<220> FEATURE:
<223> OTHER INFORMATION: Artificial Sequence
<220> FEATURE:
<221> NAME/KEY: modified_base
<222> LOCATION: (1)..(3)
<223> OTHER INFORMATION: 2'-O-methyl-modified bases from 1 to 3
<220> FEATURE:
<221> NAME/KEY: modified_base
<222> LOCATION: (30)..(32)
<223> OTHER INFORMATION: 2'-O-methyl-modified bases from 30 to 32

<400> SEQUENCE: 22
guuggtatat acttctttag cttggaacca ac                                   32

<210> SEQ ID NO 23
<211> LENGTH: 79
<212> TYPE: DNA
<213> ORGANISM: Artificial Sequence
<220> FEATURE:
<223> OTHER INFORMATION: DNA aptamer SQ7a

<400> SEQUENCE: 23
agcagcacag aggtcagatg atgttggtat atacttcttt agcttggaac caactcttct     60
cctatgcgtg ctaccgtga                                                  79

<210> SEQ ID NO 24
<211> LENGTH: 80
<212> TYPE: DNA
<213> ORGANISM: Artificial Sequence
<220> FEATURE:
<223> OTHER INFORMATION: DNA aptamer SQ7b

<400> SEQUENCE: 24
agcaacacag aggtcagatg atgttggtat atacttcttt agcttggaac ccactcttgt     60
cctatgcgtg ctaccgtgaa                                                 80

<210> SEQ ID NO 25
<211> LENGTH: 80
<212> TYPE: DNA
<213> ORGANISM: Artificial Sequence
<220> FEATURE:
<223> OTHER INFORMATION: DNA aptamer SQ1

<400> SEQUENCE: 25
agcagcacag aggtcagatg cttgggctat ctcttattca tgctgttcca ccgctctcgg     60
cctatgcgtg ctaccgtgaa                                                 80

<210> SEQ ID NO 26
<211> LENGTH: 79
<212> TYPE: DNA
<213> ORGANISM: Artificial Sequence
<220> FEATURE:
<223> OTHER INFORMATION: DNA aptamer SQ2

<400> SEQUENCE: 26
agcagcacag aggtcagatg aaccgcgatc tcatctgtac gctcacccgg tcgaagggac     60
ctatgcgtgc taccgtgaa                                                  79

<210> SEQ ID NO 27
<211> LENGTH: 80
<212> TYPE: DNA
```

```
<213> ORGANISM: Artificial Sequence
<220> FEATURE:
<223> OTHER INFORMATION: DNA aptamer SQ3

<400> SEQUENCE: 27
agcagcacag aggtcagatg tgggggcgat tacgacccgg cgaaattaat agatctgccg    60
cctatgcgtg ctaccgtgaa                                                80

<210> SEQ ID NO 28
<211> LENGTH: 80
<212> TYPE: DNA
<213> ORGANISM: Artificial Sequence
<220> FEATURE:
<223> OTHER INFORMATION: DNA aptamer SQ4

<400> SEQUENCE: 28
agcagcacag aggtcagatg agtgtccaac gtcggcgaaa ttaataggtt ggaacgaacg    60
cctatgcgtg ctaccgtgaa                                                80

<210> SEQ ID NO 29
<211> LENGTH: 80
<212> TYPE: DNA
<213> ORGANISM: Artificial Sequence
<220> FEATURE:
<223> OTHER INFORMATION: DNA aptamer SQ5

<400> SEQUENCE: 29
agcagcacag aggtcagatg tcatggcaaa acgtccctac gctacgatta gttaggtcga    60
cctatgcgtg ctaccgtgaa                                                80

<210> SEQ ID NO 30
<211> LENGTH: 80
<212> TYPE: DNA
<213> ORGANISM: Artificial Sequence
<220> FEATURE:
<223> OTHER INFORMATION: DNA aptamer SQ6

<400> SEQUENCE: 30
agcagcacag aggtcagatg gcttgccaca acgtgcgacg ctatgactaa ttcggcgacc    60
cctatgcgtg ctaccgtgaa                                                80

<210> SEQ ID NO 31
<211> LENGTH: 80
<212> TYPE: DNA
<213> ORGANISM: Artificial Sequence
<220> FEATURE:
<223> OTHER INFORMATION: DNA aptamer SQ8

<400> SEQUENCE: 31
agcagcacag aggtcagatg cttgggctat ttcttattca tgctgttcca ccgctctcgg    60
cctatgcgtg ctaccgtgaa                                                80

<210> SEQ ID NO 32
<211> LENGTH: 80
<212> TYPE: DNA
<213> ORGANISM: Artificial Sequence
<220> FEATURE:
<223> OTHER INFORMATION: DNA aptamer SQ9

<400> SEQUENCE: 32
agcagcacag aggtcagatg attcaacttt gaataagtcc agtgacttct aacatagtgg    60
cctatgcgtg ctaccgtgaa                                                80
```

<210> SEQ ID NO 33
<211> LENGTH: 80
<212> TYPE: DNA
<213> ORGANISM: Artificial Sequence
<220> FEATURE:
<223> OTHER INFORMATION: DNA aptamer SQ10

<400> SEQUENCE: 33
agcagcacag aggtcagatg ctcttgaagg gatacattgc ccttcgatgc ttgtctgatc    60
cctatgcgtg ctaccgtgaa                                               80

<210> SEQ ID NO 34
<211> LENGTH: 80
<212> TYPE: DNA
<213> ORGANISM: Artificial Sequence
<220> FEATURE:
<223> OTHER INFORMATION: DNA aptamer SQ11

<400> SEQUENCE: 34
agcagcacag aggtcagatg gtgccaacct gaagtgactg agatatcaac cggtaggcct    60
cctatgcgtg ctaccgtgaa                                               80

<210> SEQ ID NO 35
<211> LENGTH: 43
<212> TYPE: DNA
<213> ORGANISM: Artificial Sequence
<220> FEATURE:
<223> OTHER INFORMATION: DNA aptamer SQ8-1

<400> SEQUENCE: 35
cagcacagag gtcagatgct tgggctattt cttattcatg ctg                     43

<210> SEQ ID NO 36
<211> LENGTH: 26
<212> TYPE: DNA
<213> ORGANISM: Artificial Sequence
<220> FEATURE:
<223> OTHER INFORMATION: DNA aptamer SQ8-2

<400> SEQUENCE: 36
cagcacagag gtcagatgct tgggct                                        26

<210> SEQ ID NO 37
<211> LENGTH: 32
<212> TYPE: DNA
<213> ORGANISM: Artificial Sequence
<220> FEATURE:
<223> OTHER INFORMATION: DNA aptamer SQ8-3

<400> SEQUENCE: 37
catgctgttc caccgctctc ggcctatgcg tg                                 32

<210> SEQ ID NO 38
<211> LENGTH: 28
<212> TYPE: DNA
<213> ORGANISM: Artificial Sequence
<220> FEATURE:
<223> OTHER INFORMATION: DNA aptamer SQ8-4

<400> SEQUENCE: 38
agcagcacag aggtcagatg cttgggct                                      28

<210> SEQ ID NO 39

```
<211> LENGTH: 23
<212> TYPE: DNA
<213> ORGANISM: Artificial Sequence
<220> FEATURE:
<223> OTHER INFORMATION: DNA aptamer SQ8-5

<400> SEQUENCE: 39
ctcggcctat gcgtgctacc gtg                                        23

<210> SEQ ID NO 40
<211> LENGTH: 30
<212> TYPE: DNA
<213> ORGANISM: Artificial Sequence
<220> FEATURE:
<223> OTHER INFORMATION: DNA aptamer SQ8-6

<400> SEQUENCE: 40
caccgctctc ggcctatgcg tgctaccgtg                                 30
```

HUMANIZED ANTIBODY TO DIGOXIGENIN AND USES THEREOF

TECHNICAL FIELDS

The present invention relates to humanized antibodies having outstanding binding ability to digoxigenin and uses thereof.

BACKGROUND ART

Various physiologically active components such as compounds, ligands, and cytotoxic substances lose their efficacy through various mechanisms such as decomposition or conversion into other components in the body. In particular, since most of the substances are decomposed and excreted through the kidneys and thus lose their efficacy, studies are being conducted to improve the bioavailability of physiologically active components by increasing the half-life in vivo.

In this regard, attempts have been made to develop an antibody-drug conjugate. For example, an antibody that binds to a target tissue, cell, protein, etc. is covalently linked with a drug to be delivered to the tissue, etc. (Antibody-drug conjugates—an emerging class of cancer treatment. Nikolaos Diamantis, Udai Banerji. Br J Cancer. 2016 Feb. 16; 114(4): 362-367). In the meantime, attempts to conjugate polyethylene glycol (PEG) have also been made to increase the half-life of drugs in the body (PEGylation, successful approach to drug delivery. Francesco M. Veronese, Gianfranco Pasut. Drug Discovery Today. 2005 Nov. 1; 10(21): 1451-1458).

However, it is very difficult to deliver the desired drug to the inside of the desired tissue through capillaries because the drug that reaches the target tissue or cell by being directly linked to the antibody or polyethylene glycol becomes a very large molecule in the form of linkage with these. Accordingly, there is a need to develop a new type of drug delivery system capable of increasing the residence time of the drug in the human body and at the same time delivering the drug well to a target tissue or cell.

On the other hand, digoxigenin is a kind of steroid extracted and discovered from a plant called *Digitalis purpurea*, and corresponds to the aglycone, which is the non-saccharide part of the glycoside of digoxin. Digoxigenin is generally known as a hapten, a substance that does not have immunogenicity, and is often used in the field of molecular biology using these properties.

Digoxigenin is used for similar purposes to other widely used haptens, such as 2,4-dinitrophenol, biotin, and fluorescein. In order to measure biomolecules such as nucleic acids, they are chemically bound to the corresponding biomolecules. Among them, biotin, fluorescein, and digoxigenin are generally known as the most commonly used haptens.

Biotin has the advantage of having the strongest binding force among them by binding to avidin, but has the disadvantage that non-specific binding to avidin may occur because some tissues such as the liver may contain endogenous biotin.

In addition, in the case of fluorescein haptens, there is an advantage in that the bound biomolecules can be directly confirmed with a fluorescence microscope or indirectly confirmed using an anti-fluorescein antibody, but background problems may occur when viewing data using a microscope and the signal does not last for a long time.

On the other hand, since digoxigenin is widely used in the field of molecular biology and the like, various antibodies targeting it have already been commercialized. Anti-digoxigenin antibodies with high avidity and specific binding are used in various biological immunoassays (e.g., ELISA). Antibodies are directly or indirectly labeled with dyes, enzymes or fluorescent substances for visualization or measurement of substances.

In this regard, digoxigenin is used as a variety of immunolabels, and is particularly used as a standard immunohistochemical label for in situ hybridization experiments. In this experiment, digoxigenin is incorporated into RNA by being conjugated to a specific species of RNA nucleoside triphosphate (usually uridine).

On the other hand, no modification has been made on the premise of use in the human body for the antibody against digoxigenin, which is used only for the purpose of haptens in the field of molecular biology.

PRIOR ART LITERATURE (Patent Document 1) Korean Patent Registration No. 10-1648960

(Patent Document 2) Korean Patent Registration No. 10-1827962

DISCLOSURE

Technical Problem

The inventors of the present invention paid attention to digoxigenin, which has been used as a conventional biochemical detection means, while examining a system capable of increasing the residence time in a drug delivery system. Surprisingly, it was found that digoxigenin and a humanized antibody system therefor can be used as a drug delivery system to increase the half-life of a drug administered to the human body. To this end, as a result of intensive efforts to develop a humanized antibody of a conventional anti-digoxigenin mouse antibody, an antibody that can be used in humans and has better antigen binding ability than mouse antibodies was developed, and its effect was confirmed.

Technical Solution

In order to solve the above object, one aspect of the present invention provides an anti-digoxigenin antibody, specifically an antibody or antigen-binding fragment thereof that specifically recognizes digoxigenin.

Effects of the Invention

It is expected that the complex comprising an antibody or an antigen-binding fragment thereof that specifically recognizes digoxigenin according to one aspect of the present invention (Drug-conjugated Oligobody; DOligobody) can adjust the concentration of a physiologically active substance in the body or increase the half-life of a drug in vivo, if necessary.

[21H8]-v8, humab [21H8]-v9, humab [21H8]-v10, humab [21H8]-v11, humab [21H8]-v12, humab [21H8]-v13, humab [21H8]-v14, humab [21H8]-v15, humab [21H8]-v16) prepared in the present invention with digoxigenin (DIG) by ELISA experiment.

Figure 2:
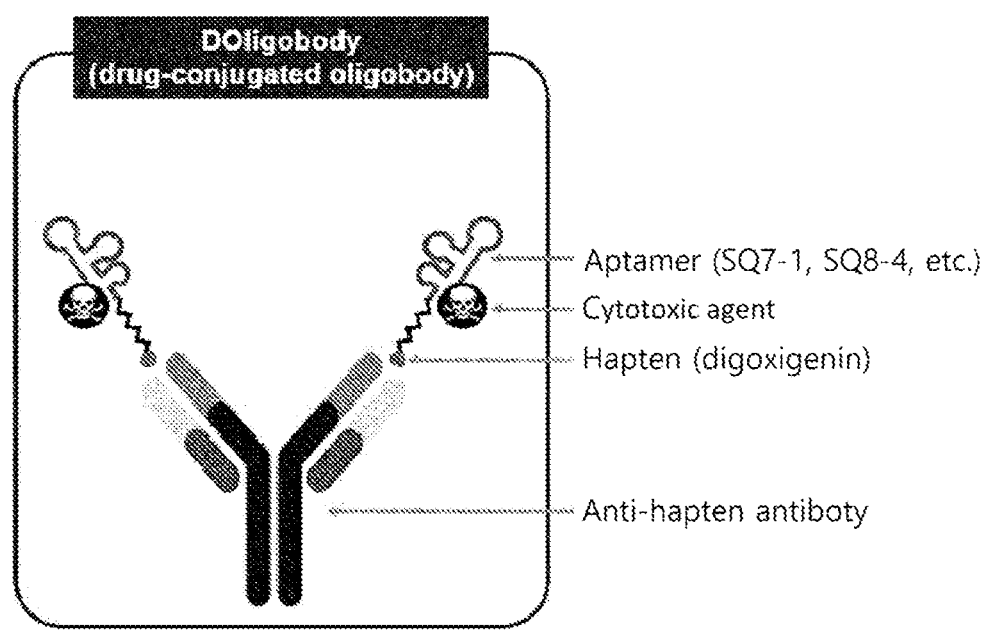

FIG. 2 is a diagram showing the structure of a complex (Drug-conjugated Oligobody; DOligobody) by combining the antibody prepared in the present invention with a DIG-aptamer-MMAE conjugate.

Figure 3A:
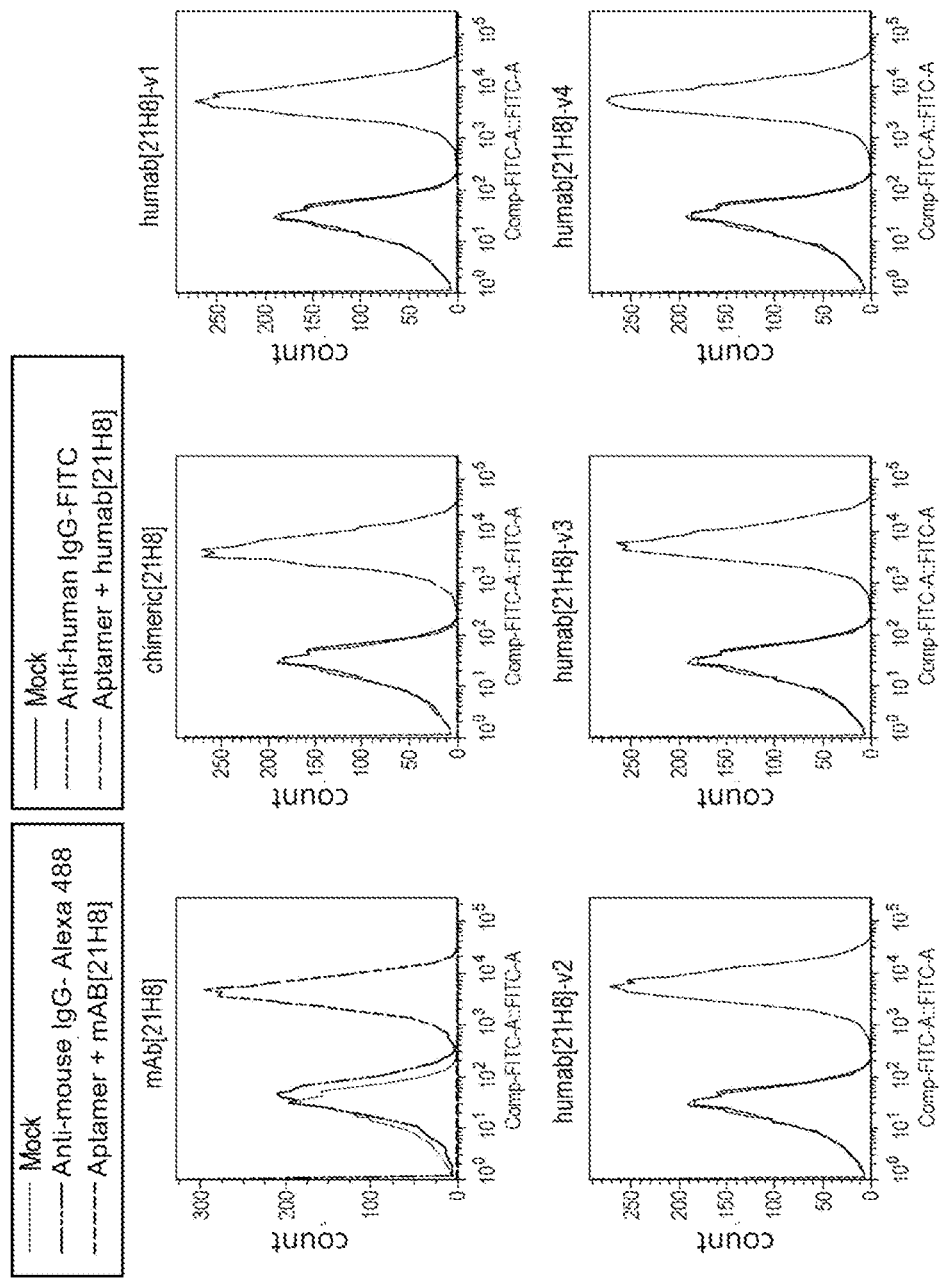
Figure 3B:
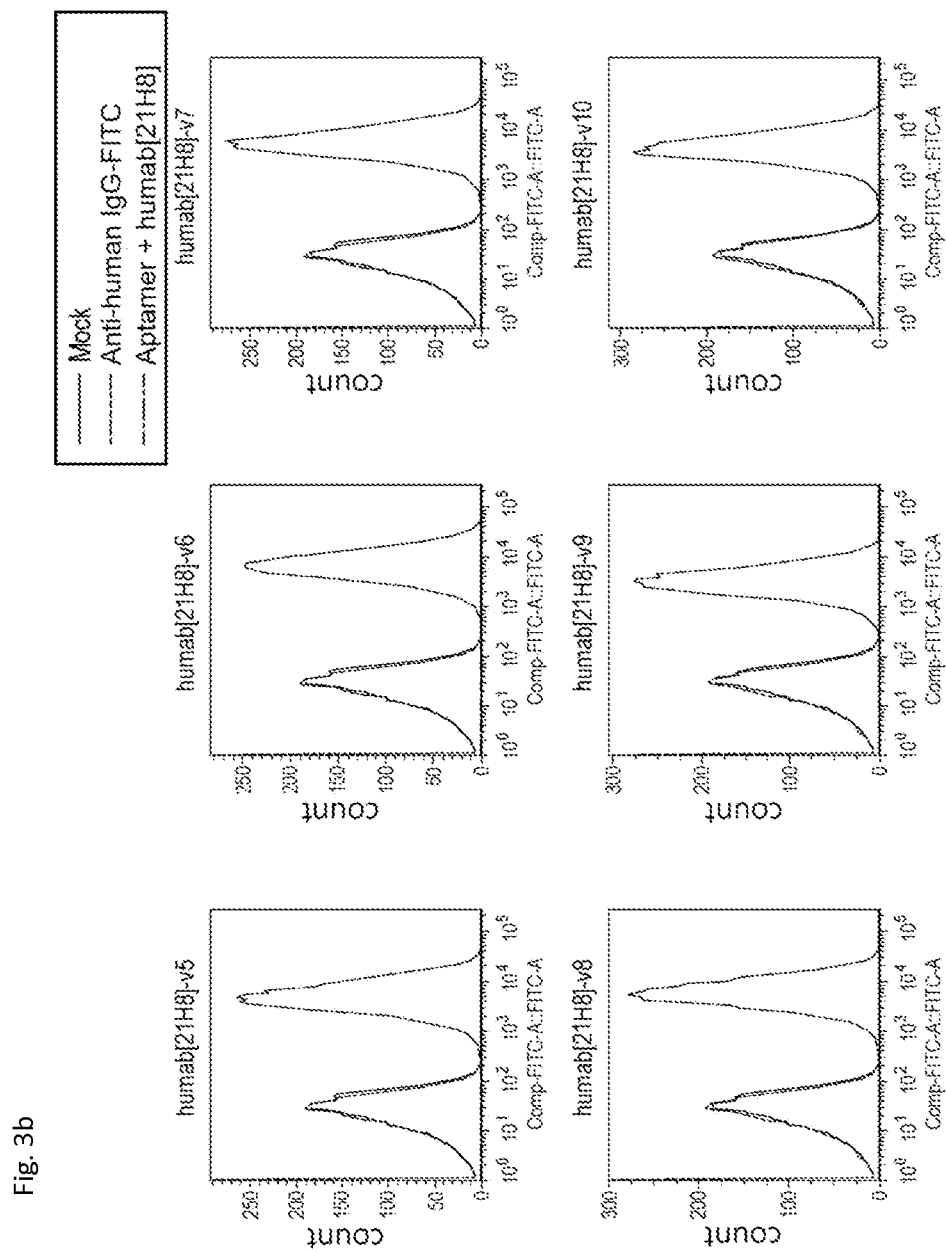
Figure 3C:
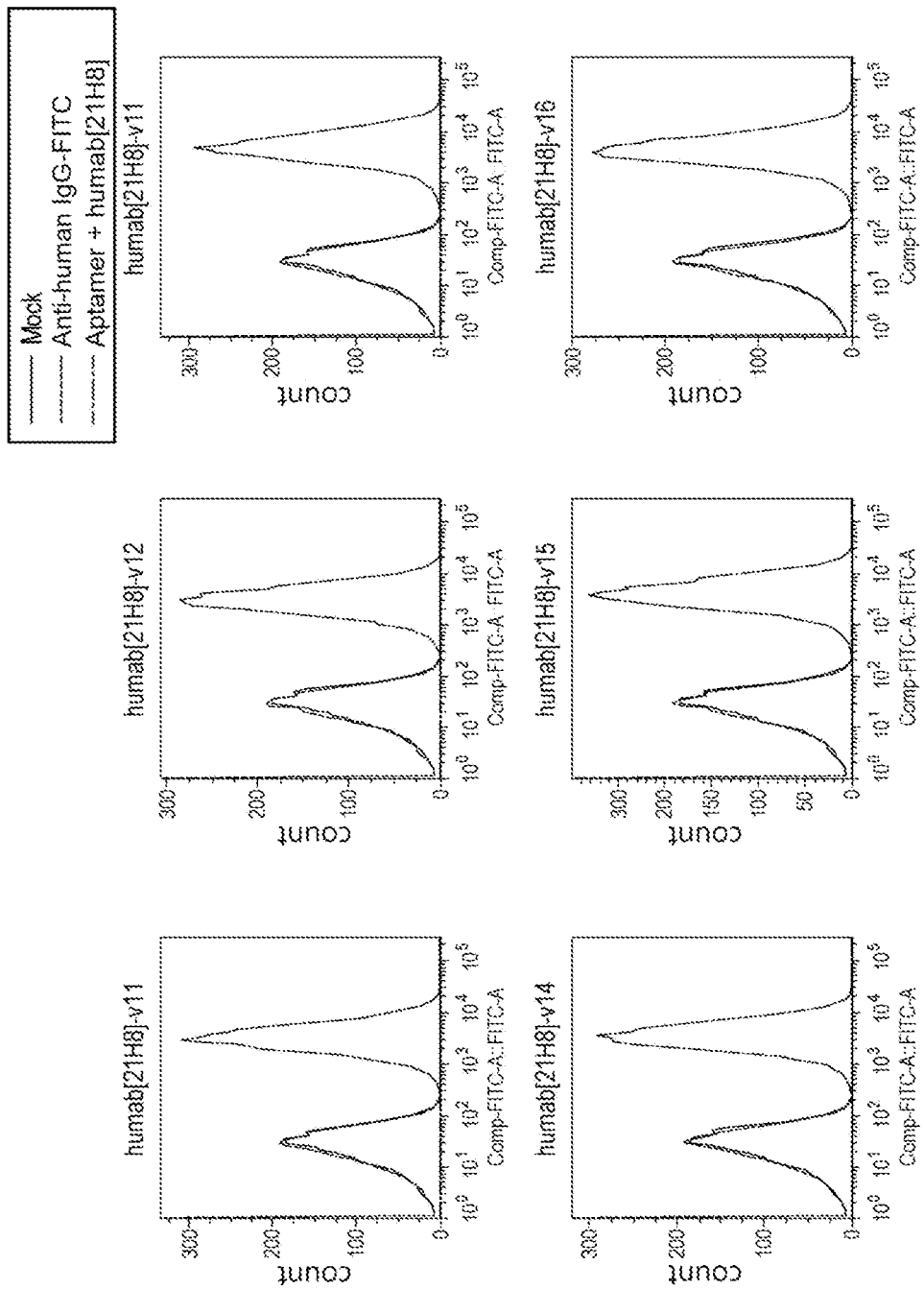

FIG. 3 (FIG. 3a to FIG. 3c) is a graph showing the binding ability of the complex (DOligobody) to CFPAC-1, a human pancreatic cancer cell line, by binding the antibody prepared in the present invention with the DIG-aptamer-MMAE conjugate through a FACS experiment.

Figure 4:
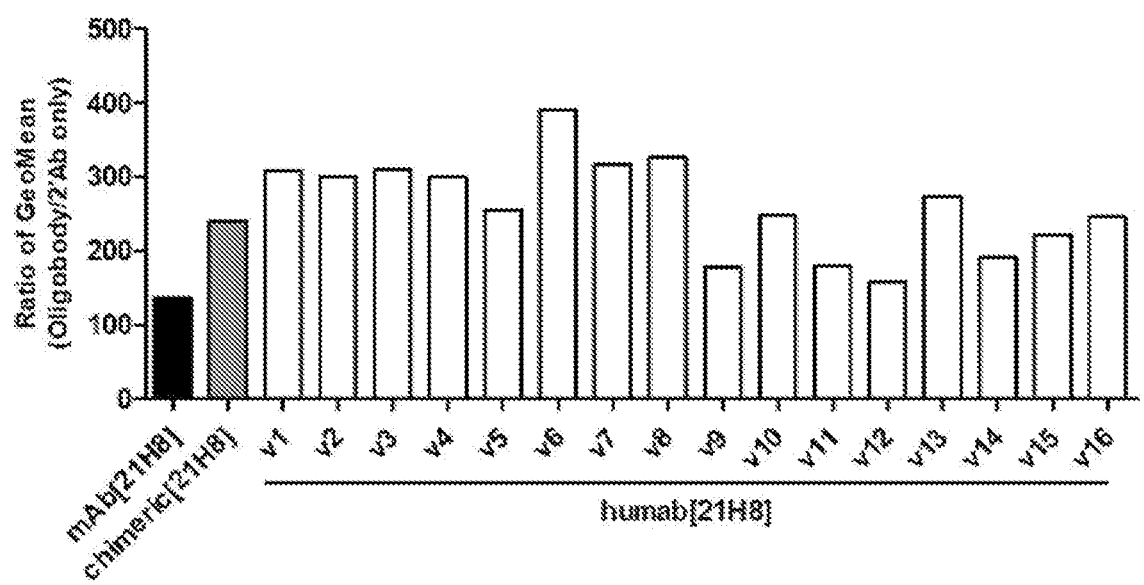

FIG. 4 is a graph of the results of comparing the binding rate of DOligobody, which is a complex of the present invention, based on FACS results.

Figure 5:
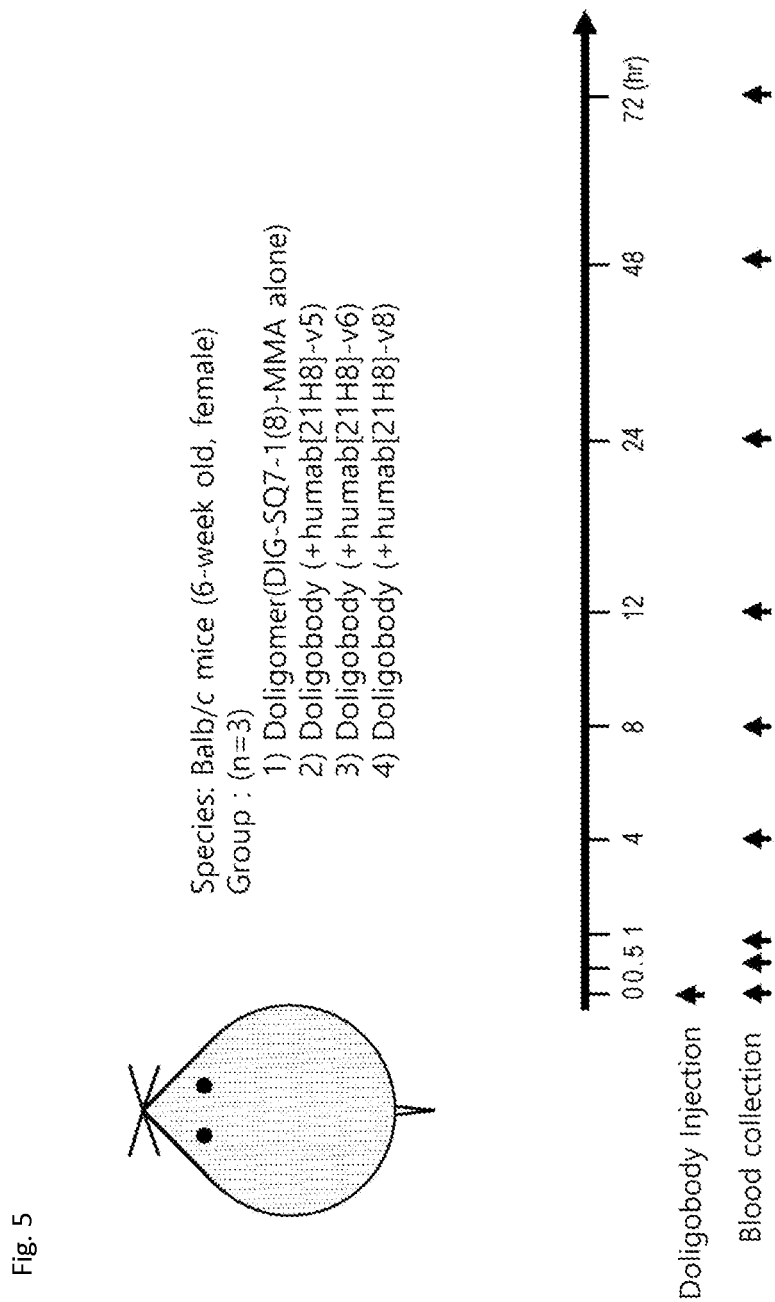

FIG. 5 is a schematic diagram illustrating the outline of pharmacokinetic experiments of a complex (Doligobody) containing anti-digoxigenin antibody.

Figures 6, 7:
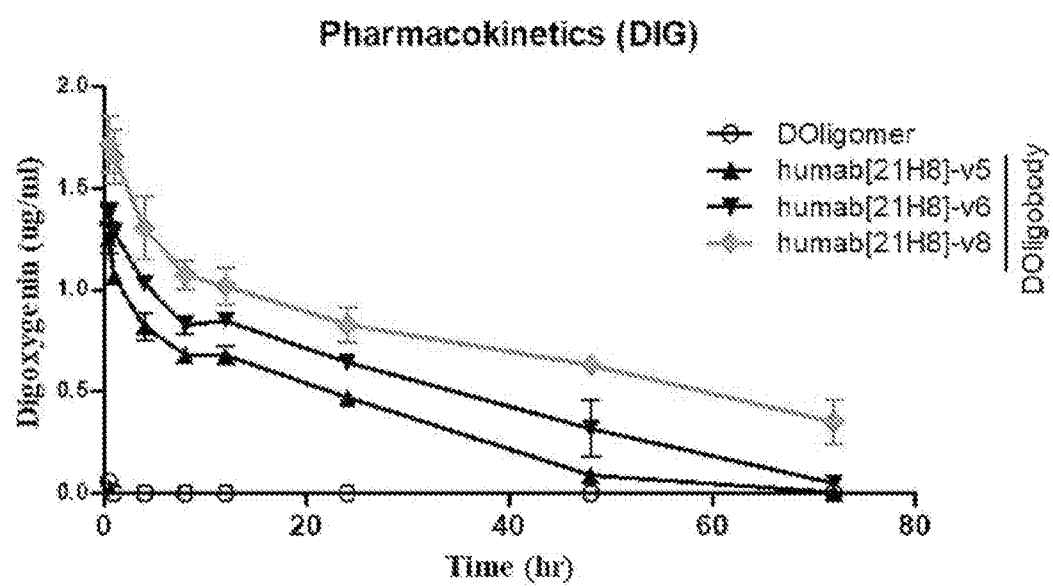

FIG. 6 is a graph showing the pharmacokinetic results of a complex (Doligobody) containing DOligomer including digoxigenin and an aptamer, and an anti-digoxigenin antibody of humab[21H8]-v5 antibody, humab [21H8]-v6 antibody, or humab [21H8]-v8 antibody.

FIG. 7 is a table summarizing half-lives measured through pharmacokinetic results of a complex (DOligobody) containing a conjugate comprising digoxigenin and an aptamer (Doligomer), and anti-digoxigenin antibody of humab [21H8]-v5 antibody, humab [21H8]-v6 antibody, or humab [21H8]-v8 antibody.

Figures 8, 9:
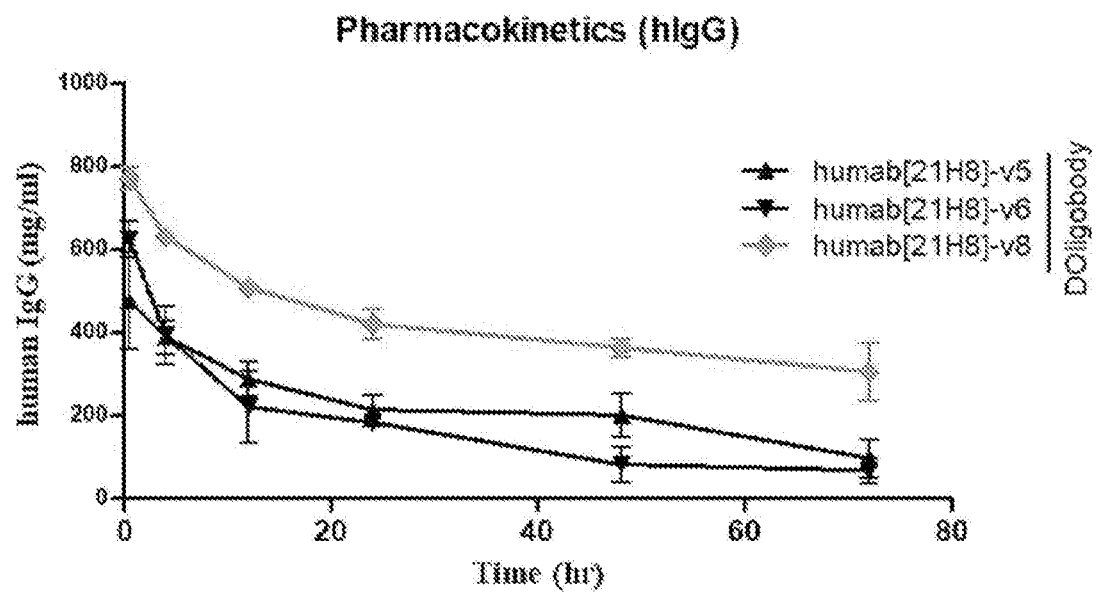

FIG. 8 is a graph showing the pharmacokinetic results for the DOligobody complex containing anti-digoxigenin antibody of humab [21H8]-v5 antibody, humab [21H8]-v6 antibody, or humab [21H8]-v8 antibody.

FIG. 9 is a table summarizing half-lives measured through pharmacokinetic results of a complex (DOligobody) containing anti-digoxigenin antibody of humab [21H8]-v5 antibody, humab [21H8]-v6 antibody, or humab [21H8]-v8 antibody.

MODE OF THE INVENTION

Embodiments or aspects of the present invention are illustrated for the purpose of explaining the technical idea of the present invention. The scope of rights according to the present invention is not limited to the embodiments or aspects presented below or specific description thereof.

In addition, those skilled in the art to which the inventors belong will recognize, or be able to ascertain using no more than routine experimentation, many equivalents to the specific embodiments of the invention described herein. Such equivalents are intended to be included in this invention.

All technical terms and scientific terms used in the present invention have meanings commonly understood by those of ordinary skill in the art to which the present inventors belong unless otherwise defined. All terms used in the present invention are selected for the purpose of more clearly describing the present invention and are not selected to limit the scope of rights according to the present invention.

Expressions such as "comprising", "including", "having", etc. used in the present invention are open-ended terms that imply the possibility of including other embodiments, unless otherwise stated in the phrase or sentence in which the expression is included. (open-ended terms).

Expressions such as "consisting only of" a corresponding component used in the present invention should be understood as closed-ended terms excluding the possibility of including other components other than the corresponding component.

Singular expressions described in the present invention may include plural meanings unless otherwise stated, and this applies to singular expressions described in the claims as well.

In the present invention, "antibody" refers to a substance produced by stimulation of an antigen in the immune system, and its type is not particularly limited. In the present specification, antibodies include animal antibodies, chimeric antibodies, humanized antibodies, or fully human antibodies. In addition, the antibody herein includes an antigen-binding fragment of an antibody having antigen-binding ability, such as Fab.

In the present invention, a "chimeric antibody" refers to an antibody derived from an animal in which the antibody variable region or its complementarity determining region (CDR) is different from the rest of the antibody. Such an antibody may be, for example, an antibody in which the antibody variable region is derived from a non-human animal (e.g., mouse, rabbit, poultry, etc.) and the antibody constant region is derived from a human. Such chimeric antibodies can be produced by methods such as genetic recombination known in the art.

The antibody may be a polyclonal antibody or a monoclonal antibody. The antibody may be selected from immunoglobulins of all subtypes (e.g., IgA, IgD, IgE, IgG (IgG1, IgG2, IgG3, IgG4), IgM, etc.). The IgG type antibody may be of the IgG1, IgG2, IgG3, or IgG4 subtype, such as an IgG1 or IgG2 subtype.

As used herein, an "antigen-binding fragment" of an antibody or immunoglobulin chain (heavy chain or light chain) lacks some amino acids compared to the full-length chain, but contains a portion of the antibody capable of specifically binding to an antigen. Such antigen-binding fragments can be said to be biologically active in that they can specifically bind to a target antigen or compete with other antibodies or antigen-binding fragments for binding to a specific epitope. Specifically, the antigen-binding fragment may be selected from the group consisting of antibody fragments comprising one or more complementarity determining regions, such as scFv, (scFv)$_2$, scFv-Fc, Fab, Fab' and F(ab')$_2$, but is not limited thereto. Such biologically active fragments can be produced by recombinant DNA techniques or, for example, by enzymatic or chemical digestion of intact antibodies.

In the present invention, "heavy chain" refers to a full-length heavy chain and fragments thereof comprising a variable region domain VH and three constant region domains CH1, CH2 and CH3 comprising sufficient variable region amino acid sequences to impart specificity to an antigen.

In the present invention, "light chain" refers to a full-length light chain and fragments thereof comprising a variable region domain VL and a constant region domain CL comprising sufficient variable region amino acid sequences to impart specificity to an antigen.

In the present invention, "complementarity determining region" means a region that imparts binding specificity to an antigen among variable regions of an antibody.

In the present invention, "anti-digoxigenin humanized antibody or antigen-binding fragment thereof" can include a heavy chain variable region comprising an amino acid sequence selected from the group consisting of SEQ ID NOs: 2 to 5; and a light chain variable region comprising an amino acid sequence selected from the group consisting of SEQ ID NOs: 7 to 10. For example, the anti-digoxigenin humanized antibody or antigen-binding fragment thereof of the present invention can be one of the following:

a) an anti-digoxigenin humanized antibody or antigen-binding fragment thereof comprising a heavy chain variable region including the amino acid sequence of SEQ ID NO: 2; and a light chain variable region including the amino acid sequence of SEQ ID NO: 7;
b) an anti-digoxigenin humanized antibody or antigen-binding fragment thereof comprising a heavy chain variable region including the amino acid sequence of SEQ ID NO: 3; and a light chain variable region including the amino acid sequence of SEQ ID NO: 7;
c) an anti-digoxigenin humanized antibody or antigen-binding fragment thereof comprising a heavy chain variable region including the amino acid sequence of SEQ ID NO: 4; and a light chain variable region including the amino acid sequence of SEQ ID NO: 7;
d) an anti-digoxigenin humanized antibody or antigen-binding fragment thereof comprising a heavy chain variable region including the amino acid sequence of SEQ ID NO: 5; and a light chain variable region including the amino acid sequence of SEQ ID NO: 7;
e) an anti-digoxigenin humanized antibody or antigen-binding fragment thereof comprising a heavy chain variable region including the amino acid sequence of SEQ ID NO: 2; and a light chain variable region including the amino acid sequence of SEQ ID NO: 8;
f) an anti-digoxigenin humanized antibody or antigen-binding fragment thereof comprising a heavy chain variable region including the amino acid sequence of SEQ ID NO: 3; and a light chain variable region including the amino acid sequence of SEQ ID NO: 8;
g) an anti-digoxigenin humanized antibody or antigen-binding fragment thereof comprising a heavy chain variable region including the amino acid sequence of SEQ ID NO: 4; and a light chain variable region including the amino acid sequence of SEQ ID NO: 8;
h) an anti-digoxigenin humanized antibody or antigen-binding fragment thereof comprising a heavy chain variable region including the amino acid sequence of SEQ ID NO: 5; and a light chain variable region including the amino acid sequence of SEQ ID NO: 8;
i) an anti-digoxigenin humanized antibody or antigen-binding fragment thereof comprising a heavy chain variable region including the amino acid sequence of SEQ ID NO: 2; and a light chain variable region including the amino acid sequence of SEQ ID NO: 9;
j) an anti-digoxigenin humanized antibody or antigen-binding fragment thereof comprising a heavy chain variable region including the amino acid sequence of SEQ ID NO: 3; and a light chain variable region including the amino acid sequence of SEQ ID NO: 9;
k) an anti-digoxigenin humanized antibody or antigen-binding fragment thereof comprising a heavy chain variable region including the amino acid sequence of SEQ ID NO: 4; and a light chain variable region including the amino acid sequence of SEQ ID NO: 9;
l) an anti-digoxigenin humanized antibody or antigen-binding fragment thereof comprising a heavy chain variable region including the amino acid sequence of SEQ ID NO: 5; and a light chain variable region including the amino acid sequence of SEQ ID NO: 9;
m) an anti-digoxigenin humanized antibody or antigen-binding fragment thereof comprising a heavy chain variable region including the amino acid sequence of SEQ ID NO: 2; and a light chain variable region including the amino acid sequence of SEQ ID NO: 10;
n) an anti-digoxigenin humanized antibody or antigen-binding fragment thereof comprising a heavy chain variable region including the amino acid sequence of SEQ ID NO: 3; and a light chain variable region including the amino acid sequence of SEQ ID NO: 10;
o) an anti-digoxigenin humanized antibody or antigen-binding fragment thereof comprising a heavy chain variable region including the amino acid sequence of SEQ ID NO: 4; and a light chain variable region including the amino acid sequence of SEQ ID NO: 10, and
p) an anti-digoxigenin humanized antibody or antigen-binding fragment thereof comprising a heavy chain variable region including the amino acid sequence of SEQ ID NO: 5; and a light chain variable region including the amino acid sequence of SEQ ID NO: 10.

In the present invention, a "humanized antibody" is an antibody containing a sequence derived from a non-human immunoglobulin that specifically binds to a specific antigen, and has a complementarity determining region (CDR) that determines the binding ability to the antigen in the non-human immunoglobulin. On the other hand, in the humanized antibody, human immunoglobulin Fv framework region (FR) residues may be replaced with corresponding non-human FR residues, or may contain residues which are not found in CDRs or FR sequences of non-human immunoglobulins or human immunoglobulins. Such modifications may be performed to further refine and optimize antibody performance. In general, a humanized antibody may be one in which all or substantially all of the CDR regions correspond to those of a non-human immunoglobulin, and may be one in which all or substantially all of the FR residues include substantially all of at least one, and typically two, variable domains of the residues of the human immunoglobulin consensus sequence.

In the present invention, the anti-digoxigenin humanized antibody or antigen-binding fragment thereof may include any one of the amino acid sequences of SEQ ID NOs: 2 to 5 or any one of SEQ ID NOs: 7 to 10. In one aspect, the present invention provides an antibody comprising an amino acid sequence having a homology of at least about 80%, specifically at least about 90%, more specifically at least about 95%, even more specifically at least about 97%, most specifically at least about 97% of SEQ ID NOs: 2-5, or SEQ ID NOs: 7-10, and as a sequence having such homology, an amino acid sequence constituting an antibody having the substantially same or corresponding binding activity to an antibody comprising any one of the amino acid sequences of SEQ ID NOs: 2-5, or SEQ ID NOs: 7 to 10 is included without limitation. In addition, if it is an amino acid sequence having such homology, it is obvious that an amino acid sequence in which some sequences are deleted, modified, substituted, or added is also included in the scope of the present invention.

In the present invention, "conjugate" refers to a chimeric molecule of digoxigenin and another molecule, particularly a physiologically active substance described below. In the present invention, a conjugate means that digoxigenin and another molecule are covalently conjugated, and the physiologically active substance is, for example, a chemotherapeutic drug, an enzyme, a peptide, a cytotoxin, an affinity ligand, or a detection label. Specifically, in the conjugate of the present invention, digoxigenin and a physiologically active substance may be covalently conjugated through an aptamer. Covalently conjugated means that molecules are directly covalently bonded to each other, or indirectly covalently bonded to each other through a linker, spacer, linking moiety, or the like. The conjugate of digoxigenin of the present invention and a physiologically active substance may also be referred to as a drug-conjugated oligomer (DOligomer) meaning a drug-conjugated oligomer.

In the present invention, the aptamer can mean a short single-stranded oligonucleotides having characteristics of binding to target targets with high affinity and specificity, and each has a unique three-dimensional structure. An aptamer specifically binds to a target tissue, target cell, target carbohydrate, target lipid, or target protein, and the target tissue, target cell, target carbohydrate, target lipid, or target protein can be a tissue, cell, carbohydrate, lipid, or protein specific for a specific disease, for example, an infected tissue, an infected cell, an infection specific carbohydrate, an infection specific lipid, an infection specific protein; inflammatory tissues, inflammatory cells, inflammation-specific carbohydrates, inflammation-specific lipids, inflammation-specific proteins; tumor tissue, tumor cells, tumor specific carbohydrates, tumor specific lipids, or tumor proteins; etc., but is not limited thereto. In the present invention, the aptamer may include, for example, any one of the nucleotide sequences of SEQ ID NOs: 11 to 40 that bind to cancer cells, particularly pancreatic cancer tissues or pancreatic cancer cells. As a result of efforts to develop aptamers that bind to cancer cells, the inventors of the present invention confirmed that the aptamers of SEQ ID NOs: 11 to 40 could bind to cancer cells (refer to Korean Patent Publication No. 10-2020-0078303). In one aspect, the present invention provides a DNA aptamer comprising a nucleotide sequence having a sequence homology of about 80% or more, specifically about 90% or more, more specifically about 95% or more, more specifically about 97% or more, most specifically about 99% or more of the nucleotide sequence of any one of SEQ ID NOs: 11 to 40, and as a sequence having such homology, a nucleotide sequence constituting a DNA aptamer having the substantially same or corresponding binding activity to a DNA aptamer comprising any one of the nucleotide sequences of SEQ ID NOs: 11 to 40 is included without limitation. In addition, if it is a nucleotide sequence having such homology, it is obvious that a nucleotide sequence in which some sequences are deleted, modified, substituted, or added is also included in the scope of the present invention. In one aspect, the present invention may be an aptamer composed of any one of the nucleotide sequences of SEQ ID NOs: 11 to 40.

In one aspect of the present invention, the chemotherapeutic drug or cytotoxic agent It may be one selected from the group consisting of a DNA production inhibitor (e.g., calicheamicin, pyrrolobenzodiazepine (PBD), duocamycin, anthracycline/nimorubicin), doxorubicin, irinotecan, amatoxin), microtubule inhibitors (auristatin, maytansine, tubulysin), inhibitors of topoisomerase I (SN-38), inhibitors of topoisomerase II, platinum coordination compounds, alkylating agents, photosensitizers (e.g., 5-Aminolaevulinic acid (ALA), Benzoporphyrin derivative monoacid ring A (BPD-MA), chlorine, Tetra (m-hydroxyphenyl)chlorin (mTHPC), Lutetium texaphyrin), MMAE (monomethyl auristatin E), MMAF (monomethyl auristatin F), DM4 and DM1, but is not limited thereto.

In one aspect of the present invention, the detection label may be selected from the group consisting of a fluorescent substance, for example, a fluorescent dye, a fluorescent protein including a tetracysteine fluorescent motif, GFP, YFP, CFP, and RFP, or a fluorescent nanoparticle, a radio-labeled material containing a radioactive isotope selected from the group consisting of $^{18}$F, $^{124}$I, $^{125}$I, $^{131}$I, and $^{211}$At, for example, $^{18}$F-FDG (2-deoxy-2-[$^{18}$F]fluro-D-glucose), and glass dosimeters, etc., but is not limited thereto.

In the present invention, "complex" refers to a complex in which the anti-digoxigenin humanized antibody or antigen-binding fragment thereof of the present invention and the conjugate comprising digoxigenin of the present invention bind. A complex may be one in which the antibody or antigen-binding fragment thereof and the conjugate are bound by non-peptidic covalent bonds (e.g., disulfide bonds) and/or non-covalent interactions (e.g., hydrogen bonds, ionic bonds, van der Waals forces, and hydrophobic interactions, etc.). A complex in which the conjugate of the present invention and the anti-digoxigenin antibody are bound may also be referred to as a drug-conjugated oligobody (DOligobody).

In the present invention, "homology" means the same degree of base or amino acid residue between sequences after aligning both sequences to maximize matching in a specific comparison region in the amino acid sequence or base sequence of a gene encoding a protein. If the homology is sufficiently high, the expression product of the corresponding gene may have the same or similar activity. The percentage (%) of sequence identity can be determined using a known sequence comparison program (e.g., Blast (NCBI), etc.).

In one aspect of the present invention, the term "about" is used with the intention of including a slight numerical adjustment included in the manufacturing process errors included in specific values or included in the scope of the technical idea of the present invention. For example, the term "about" means a range of ±10%, in one aspect ±5%, and in another aspect ±2% of the value to which it refers. In the context of this disclosure, this level of approximation is adequate unless a value is specifically stated requiring a narrower range.

In the present invention, the protein or antibody may be expressed and produced through a method known in the art to which the present inventor belongs. Suitable host cells for expressing and producing proteins or antibodies in the present invention include the higher eukaryotic cells described herein, including vertebrate host cells. Propagation of vertebrate cells in culture has become a common technique. Examples of useful mammalian host cell lines include monkey kidney cells (CV1), monkey kidney CV1 line transformed by SV40 (COS-7), human embryonic kidney line (293 cells), baby hamster kidney cells (BHK), Chinese Hamster ovary cells (CHO), mouse Sertoli cells (TM4), African green monkey kidney cells (VERO-76), human cervical carcinoma cells (HELA), dog kidney cells (MDCK), buffalo rat liver cells (BRL 3A), human lung cells (W138), human hepatocytes (Hep G2), mouse mammary tumors (MMT 060562), TRI cells, MRC 5 cells, and FS4 cells, but are not limited thereto.

Host cells used to produce proteins or antibodies of the present invention can be cultured in a variety of media. A commercially available medium, such as Ham's F10 medium, minimum essential medium, RPMI-1640, Dulbecco's modified Eagle's medium (DMEM), and the like, and any other medium used in the art can be used for host cell culture. Any of these media may be supplemented with hormones and/or growth factors (e.g., insulin, transferrin or epidermal growth factor), salts (e.g., sodium chloride, calcium, magnesium and phosphate), buffers (e.g., HEPES), nucleotides (e.g., adenosine and thymidine), antibiotics (e.g., the GENTAMYCIN™ drug), trace elements, and glucose or equivalent energy sources, if necessary. Any other essential/ancillary supplements may also be included in appropriate concentrations known to those skilled in the art. In addition, culture conditions such as temperature, pH, and $CO_2$ concentration may be set to appropriate conditions known in relation to the host cell selected for protein expression, which will be apparent to those skilled in the art.

Proteins or antibodies in this disclosure may be purified by any protein or antibody purification method known in the art to which this disclosure pertains. Various known purification methods, for example, hydrophobic interactions, immunoaffinity or fractionation on ion-exchange columns, ethanol precipitation, reverse phase HPLC, chromatography on silica, or chromatography on anion or cation-exchange resins, chromatofocusing, SDS-PAGE, ammonium sulfate precipitation, gel filtration, or genetic engineering methods (tag, etc.) may be used, and a plurality of purification methods may be arbitrarily combined and used to increase protein purity.

In the present invention, the protein or antibody purified through the above method may have a high level of purity that can be administered to animals, particularly humans, for experimental, clinical, and therapeutic purposes.

When constructing a complex in which the anti-digoxigenin humanized antibody or antigen-binding fragment thereof of the present invention and the digoxigenin-containing conjugate of the present invention bind, the molar ratio of the anti-digoxigenin humanized antibody and the antigen bound by the digoxigenin-containing conjugate can be 1:2, but is not limited thereto.

A pharmaceutical/detection composition comprising the complex in the present invention may be formulated and administered in a manner consistent with medical practice. Factors considered in this regard may include the disease being treated or detected, the particular animal being treated or detected, the clinical condition of the individual subject, the cause of the disease, the site of delivery of the substance, the method of administration, the schedule of administration, and other factors known to the clinician. Formulations in the present invention may include liquid formulations, freeze-dried powder formulations, and the like. The pharmaceutical/detection composition of the present invention may be prepared in the form of an ampoule, vial, bottle, cartridge, reservoir, lyogect, or pre-filled syringe, and may be prepared in a single dosage form or multiple dosage form.

The "administered dose", "pharmaceutically effective amount", "therapeutically effective amount" or "effective dose" of the complex being administered will be determined by the above considerations, and is the minimum amount necessary for preventing, ameliorating, detecting or treating a particular disease. In the present invention, the "administered dose", "pharmaceutically effective amount", "therapeutically effective amount" or "effective dosage" of the complex may be about 0.001 mg/kg to about 500 mg/kg, but is not limited thereto. The pharmaceutical/detection composition of the present invention may be administered periodically, such as once a day, three times a week, twice a week, once a week, three times a month, twice a month, or once a month according to the judgment of an experienced clinician, and may be administered non-periodically in situations such as acute progression of a disease or detection urgency, but is not limited thereto.

In the present invention, the pharmaceutical/detection composition may be prepared by mixing the complex of the present invention with a physiologically acceptable carrier, excipient, or stabilizer using standard methods known in the art. Acceptable carriers include saline or buffers such as phosphate, citrate and other organic acids; antioxidants such as ascorbic acid; low molecular weight polypeptides (comprising less than about 10 amino acid residues); proteins such as serum albumin, gelatin or immunoglobulins; hydrophilicity polymers such as polyvinylpyrrolidone; amino acids such as glycine, glutamine, asparagine, arginine, or lysine; monosaccharides, disaccharides and other carbohydrates such as glucose, mannose, or dextrin; chelating agents such as EDTA; sugar alcohol such as mannitol or sorbitol; salt forming counterions such as sodium; and/or nonionic surfactants such as TWEEN", PLURONICS™, or PEG.

The pharmaceutical/detection compositions of the present invention may contain pharmaceutically acceptable salts at about physiological concentrations. Optionally, the formulations of the present invention may contain a pharmaceutically acceptable preservative. Specifically, the preservative concentration may be 0.1 to 2.0% (typically v/v). In the present invention, the preservative may be one known in the pharmaceutical industry, and specifically may be benzyl alcohol, phenol, m-cresol, methylparaben, propylparaben, or a combination thereof. The pharmaceutical/detection composition of the present invention may include a pharmaceutically acceptable surfactant at a concentration of 0.005 to 0.02%.

In the present invention, the pharmaceutical/detection composition may further contain one or more active compounds required for the treatment or detection of a target disease, specifically, active compounds having complementary activities that do not adversely affect each other with the complex of the present invention. The compound may be contained in an effective amount to achieve the intended purpose in the composition.

In one aspect of the present invention, a pharmaceutical composition for treating cancer comprising a complex in which the anti-digoxigenin humanized antibody or antigen-binding fragment thereof of the present invention; and the conjugate in which digoxigenin and a chemotherapeutic drug or cytotoxin are covalently conjugated through an aptamer that binds to cancer cells; are bound is provided. For example, the aptamer may include a nucleotide sequence of any one of SEQ ID NOs: 11 to 40, but is not limited thereto.

In one aspect of the present invention, a composition for detecting cancer cells comprising a complex in which the anti-digoxigenin humanized antibody or antigen-binding fragment thereof of the present invention; and the conjugate in which digoxigenin and a detection label are covalently conjugated via an aptamer that binds to cancer cells. For example, the aptamer may include a nucleotide sequence of any one of SEQ ID NOs: 11 to 40, but is not limited thereto.

In one aspect of the present invention, a method for treating cancer or a method for detecting cancer cells comprising administering a pharmaceutical composition/detection composition comprising the complex of the present invention is provided.

In the present invention, the pharmaceutical/detection composition containing the complex may be administered to human or animal subjects by intravenous, intramuscular, intraperitoneal, intracerebrospinal, subcutaneous, intraarticular, intrasynovial, intrathecal, oral, topical, subcutaneous, or inhalation routes according to known methods.

Hereinafter, the configuration and effects of the present invention will be described in more detail with examples and test examples. However, these examples and test examples are provided only for illustrative purposes to aid understanding of the present invention, and the scope and scope of the present invention are not limited by the following examples.

In addition, with reference to the accompanying drawings, embodiments of the present invention will be described. In the accompanying drawings, the same reference numerals may be assigned to the same or corresponding components. In addition, in the description of the following embodiments, overlapping descriptions of the same or corresponding components may be omitted. However, omission of a description of a component does not intend that such a component is not included in an embodiment.

EXAMPLE

Example 1. Preparation of Humanized Antibodies of Anti-Digoxigenin Antibodies

The inventors of the present invention attempted to prepare humanized antibodies based on mouse antibodies. Specifically, an anti-digoxigenin mouse antibody having a heavy chain variable region including SEQ ID NO: 1 and a light chain variable region including SEQ ID NO: 6 was obtained.

By analyzing the mouse antibody sequence, a humanization process was performed to maintain the binding ability as much as possible while lowering the possibility of immunogenicity by humanizing a specific sequence and maintaining the specific sequence.

※ Optimization Method of Mouse Main Antibody

The mouse monoclonal antibody used as a main antibody can be prepared by setting target antigens in various ways and can be mass-produced, so it is very useful for diagnostic reagents or basic research. However, when it is repeatedly administered to the human body for the purpose of treating a disease, it induces an immune response (HAMA, human anti-mouse antibody response) in the human body, resulting in side effects and reduced effectiveness. Therefore, it cannot be used as a therapeutic agent. In order to solve these problems, a humanized antibody manufacturing technology is required to make mouse monoclonal antibodies similar to human antibodies so that no problems occur even when administered to the human body.

An antibody is composed of a variable region and a constant region, and the variable region is composed of complementarity determining regions (CDRs) that bind directly to an antigen and framework regions (FRs) that support CDR loops. Humanized antibodies are primarily prepared by a CDR grafting method in which a CDR loop of a mouse antibody is grafted onto a human antibody (chimerization). However, since the affinity of humanized antibodies is low when only CDR grafting is performed, several key amino acid residues of framework region that are thought to affect the structure of CDRs are substituted with those of mouse antibodies to obtain similar affinity to the original mouse antibody. It performs the process of increasing the affinity to the level (humanization).

The specific humanization was performed by requesting Absolute Antibody's Prometheus™ service, and a total of 16 humanized antibody candidates were produced. Table 1 below summarizes the sequences of the heavy chain variable region and the light chain variable region of the antibody thus prepared.

TABLE 1

| ID | Format | Human Germline | Sequence | % sequence identity with human variable region sequence |
|---|---|---|---|---|
| VH-m (SEQ ID NO: 1) | mouse | — | QVTLKESGPGILQPSQTLSL TCSLSGFSLTTSGMGVGWIR QSSGKGLEWLANIWWYDTKY YNAALKSRLTISKDTSKNQV FLKIVSVDTADTATYYCGRI HYNGSRFGDYWGQGTTLTVS S | 69.1 |
| VH-h1 (SEQ ID NO: 2) | humanization | IGHV2-5*05 | QVTLKESGPTLVKPTQTLTL TCTLSGFSLTTSGMGVGWIR QPPGKALEWVLANIWWYDTK YYNASLKSRLTITKDTSKNQ VVLTMTNMDPVDTATYYCGR IHYNGSRFGDYWGQGTLVTV SS | 89.7 |
| VH-h2 (SEQ ID NO: 3) | humanization | IGHV2-5*05 | QITLKESGPTLVKPTQTLTL TCTLSGFSLTTSGMGVGWIR QPPGKALEWLANIWWYDTKY YNASLKSRLTITKDTSKNQV VLTMTNMDPVDTATYYCGRI HYNGSRFGDYWGQGTLVTVS S | 89.7 |
| VH-h3 (SEQ ID NO: 4) | humanization | IGHV4-38-2*02 | QVTLQESGPGLVKPSETLSL TCTLSGFSLTTSGMGVGWIR QPPGKGLEWLANIWWYDTKY YNASLKSRVTISKDTSKNQV SLKLSSVTAADTAVYYCGRI HYNGSRFGDYWGQGTLVTVS S | 77.8 |
| VH-h4 (SEQ ID NO: 5) | humanization | IGHV4-38-2*02 | QVQLQESGPGLVKPSETLSL TCTLSGFSLTTSGMGVGWIR QPPGKGLEWIANIWWYDTKY YNASLKSRVTISKDTSKNQV SLKLSSVTAADTAVYYCGRI HYNGSRFGDYWGQGTLVTVS S | 79.8 |
| VL-m (SEQ ID NO: 6) | mouse | — | DVVMTQTPLTLSVTFGQPAS ISCKSSQSLLYTNGKTYLMW LLQRPGQSPKRLIYLVSTLD SGVPGRFSGSGSGTDFTLKI SRVEAEDLGVYYCLqTIHFP YSFGGGTKLEIK | 79.0 |
| VL-h1 (SEQ ID NO: 7) | humanization | IGKV2D-30*01 | DVVMTQSPLSLPVTLGQPAS ISCRSSQSLLYTNGKTYLMW LQQRPGQSPRRLIYLVSTLD SGVPDRFSGSGSGTDFTLKI SRVEAEDVGVYYCLQTTHFP YSFGQGTKLEIK | 88.0 |
| VL-h2 (SEQ ID NO: 8) | humanization | IGKV2D-30*01 | \|DVVMTQSPLSLPVTLGQPA SISCRSSQSLLYTNGKTYLM WLQQRPGQSPRRLIYLVSTW DSGVPDRFSGSGSGTDFTLK ISRVEAEDVGVYYCLQTTHF PYSFGQGTKLEIK | 89.0 |
| VL-h3 (SEQ ID NO: 9) | humanization | IGKV4-1*01 | DVVMTQSPDSLAVSLGERAT INCKSSQSLLYTNGKTYLMW LQQKPGQPPKRLIYLVSTLD SGVPDRFSGSGSGTDFTLTI SSLQAEDVAVYYCLqTTHFP YSFGQGTKLEIK | 82.2 |
| VL-h4 (SEQ ID NO: ) | humanization | IGKV4-1*01 | DVVMTQSPDSLAVSLGERAT INCKSSQSLLYTNGKTYLMW LQQKPGQPPKRLIYLVSTRD | 82.2 |

TABLE 1-continued

| ID | Format | Human Germline Sequence | % sequence identity with human variable region sequence |
|---|---|---|---|
| NO: 10) | | SGVPDRFSGSGSGTDFTLTI SSLQAEDVAVYYCLqTTHFP YSFGQGTKLEIK | |

Accordingly, one chimeric antibody and 16 humanized antibodies were prepared by combining the heavy chain variable region and the light chain variable region of Table 1 above. The variable region combinations of the prepared humanized antibodies are summarized in Table 2 below.

TABLE 2

| Clone name | Format | heavy chain variable region | light chain variable region |
|---|---|---|---|
| mAb [21H8] | mouse IgG1 | VH-m | VL-m |
| chimeric[21H8] | Chimeric IgG1 | VH-m | VL-m |
| humab [21H8]-v1 | Humanized Human IgG1 | VH-h1 | VL-h1 |
| humab [21H8]-v2 | Humanized Human IgG1 | VH-h1 | VL-h2 |
| humab [21H8]-v3 | Humanized Human IgG1 | VH-h1 | VL-h3 |
| humab [21H8]-v4 | Humanized Human IgG1 | VH-h1 | VL-h4 |
| humab [21H8]-v5 | Humanized Human IgG1 | VH-h2 | VL-h1 |
| humab [21H8]-v6 | Humanized Human IgG1 | VH-h2 | VL-h2 |
| humab [21H8]-v7 | Humanized Human IgG1 | VH-h2 | VL-h3 |
| humab [21H8]-v8 | Humanized Human IgG1 | VH-h2 | VL-h4 |
| humab [21H8]-v9 | Humanized Human IgG1 | VH-h3 | VL-h1 |
| humab [21H8]-v10 | Humanized Human IgG1 | VH-h3 | VL-h2 |
| humab [21H8]-v11 | Humanized Human IgG1 | VH-h3 | VL-h3 |
| humab [21H8]-v12 | Humanized Human IgG1 | VH-h3 | VL-h4 |
| humab [21H8]-v13 | Humanized Human IgG1 | VH-h4 | VL-h1 |
| humab [21H8]-v14 | Humanized Human IgG1 | VH-h4 | VL-h2 |
| humab [21H8]-v15 | Humanized Human IgG1 | VH-h4 | VL-h3 |
| humab [21H8]-v16 | Humanized Human IgG1 | VH-h4 | VL-h4 |

The genes having nucleotide sequence encoding the combination of the heavy chain variable region above and the light chain variable region above were cloned into an antibody expression plasmid (Absolute Antibody cloning and expression vector), and codon optimization was performed so that expression in human cells could occur well. The correct sequence was confirmed through Sanger sequencing using DNASTAR Lasergene software, and the size was confirmed once more through plasmid DNA prep, and a sufficient amount of high-purity plasmid DNA for transfection was obtained. The prepared high-purity plasmid DNA was transiently transfected into the HEK 293 cell line (human fetal kidney cell 293). Cells were transiently transfected with vectors expressing the heavy and light chains and cultured for 6 days. Cultures were centrifuged at 4000 rpm and filtered with a 0.22 µM filter. The antibody was first eluted with pH 3.0 citrate buffer followed by pH 9.0 0.5M Tris neutralization buffer through Protein A affinity chromatography. The eluted protein was buffer exchanged with PBS using a desalting column. The obtained antibody concentration was confirmed by UV spectroscopy, and the antibody was concentrated as needed.

Mouse antibody prepared above (mAb [21H8]), chimeric antibody (chimeric [21H8]), humanized antibodies (humab [21H8]-v1, humab [21H8]-v2, humab [21H8]-v3, humab [21H8]-v4, humab [21H8]-v5, humab [21H8]-v6, humab [21H8]-v7, humab [21H8]-v8, humab [21H8]-v9, humab [21H8]-v10, humab [21H8]-v11, humab [21H8]-v12, humab [21H8]-v13, humab [21H8]-v14, humab [21H8]-v15, humab [21H8]-v16) were tested for binding ability with digoxigenin.

Example 2. Confirmation of Binding Ability of Anti-Digoxigenin Humanized Antibody Mouse antibody prepared above (mAb [21H8]), chimeric antibody (chimeric [21H8]), humanized antibodies (humab [21H8]-v1, humab [21H8]-v2, humab [21H8]-v3, humab [21H8]-v4, humab [21H8]-v5, humab [21H8]-v6, humab [21H8]-v7, humab [21H8]-v8, humab [21H8]-v9, humab [21H8]-v10, humab [21H8]-v11, Humab [21H8]-v12, humab [21H8]-v13, humab [21H8]-v14, humab [21H8]-v15, humab [21H8]-v16) were tested for binding to digoxigenin through ELISA experiments. ELISA experiments were conducted under the following conditions.

※ ELISA Test Method 1) 100 µL each of digoxigenin-BSA (CellMosaic™, Cat. No. CM52107) at a concentration of 4 µg/ml was placed on an Immuno Clear plate (Thermo Scientific™, Cat No. 468667) and left overnight at 4° C.

2) Washed the plate 4 times with 150 µL of PBS+0.05% Tween-20 (PBS-T).

3) 100 µL of Blocking solution (PBS+3% BSA (Calbiochem®, Cat. No. 126609)) was treated with the plate and allowed to stand at room temperature for 2 hours.

4) After removing the blocking solution from the plate, 50 µL of each antibody (mAb [21H8], chimeric [21H8], humab [21H8]-v1~v16) was treated at various concentrations (serial dilution by ⅓ from 53.33 nM, that is, 17.7 nM, 5.92 nM, 1.97 nM, 0.66 nM, 0.22 nM, 0.07 nM, 0.024 nM) and allowed to stand at room temperature for 1 hour.

5) Washed the plate 4 times with 150 µL of PBS-T.

6) 50 µL of secondary antibody (HRP-conjugated IgG) was treated and allowed to stand at room temperature for 1 hour. Specifically, sheep anti-mouse IgG (whole molecule), HRP (Sigma, Cat. No. A6782) and rabbit anti-human IgG Fc secondary antibody, HRP (invitrogen, Cat. No. 31423) were diluted at ⅕₀₀₀, respectively and used.

7) Washed the plate 4 times with 150 µL of PBS-T.

8) 100 µL of 1-Step™ Ultra TMB-ELISA Substrate (ThermoFisher Scientific, Cat. No. 34029) was applied to the plate and incubated for 10 minutes.

9) Stopped the reaction with 40 µL of 2.5 $NH_2SO_4$.

10) OD value was measured at 450 nm absorbance using Synergy™ H1 Hybrid Multi-Mode Reader (BioTek).

Figure 1A:
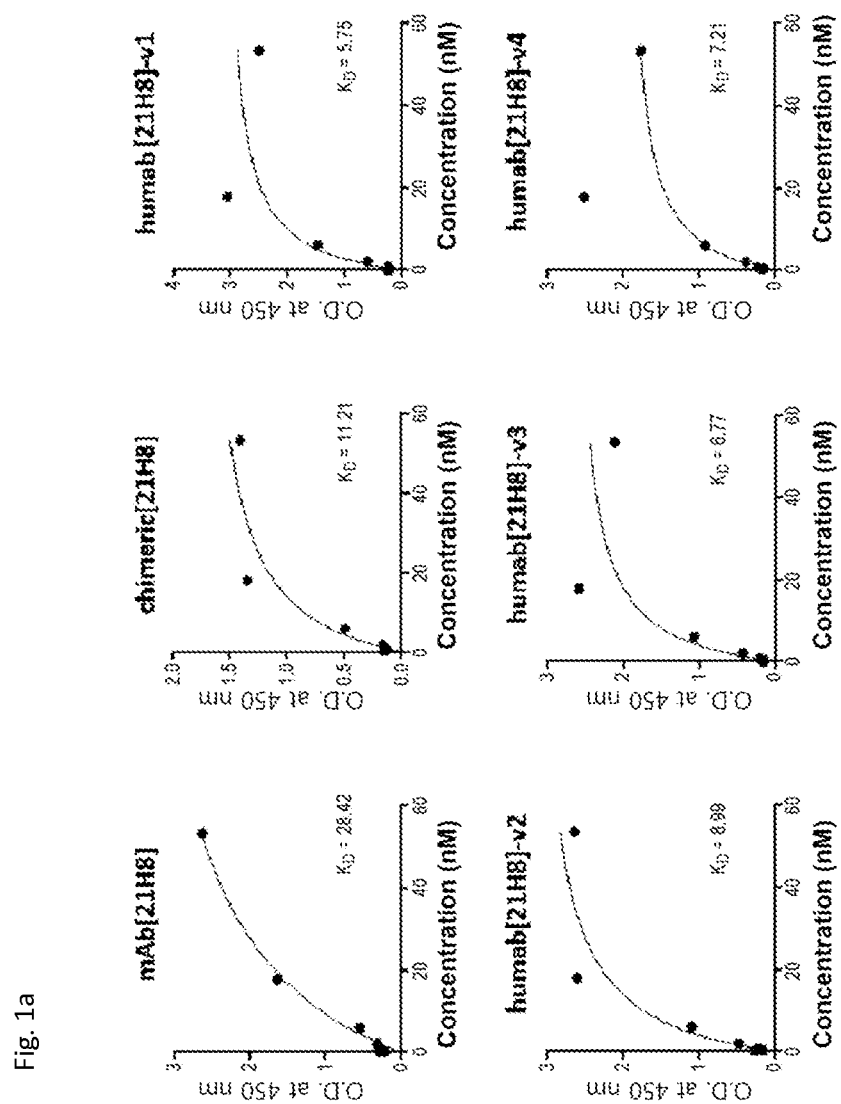
FIG. 1 (FIGS. 1a to 1c) is a graph showing the result of confirming the binding ability of the mouse antibody (mAb [21H8]), chimeric antibody (chimeric [21H8]), humanized antibodies (humab [21H8]-v1, humab [21H8]-v2, humab [21H8]-v2, humab [21H8]-v3, humab [21H8]-v4, humab [21H8]-v5, humab [21H8]-v6, humab [21H8]-v7, humab
Figure 1B:
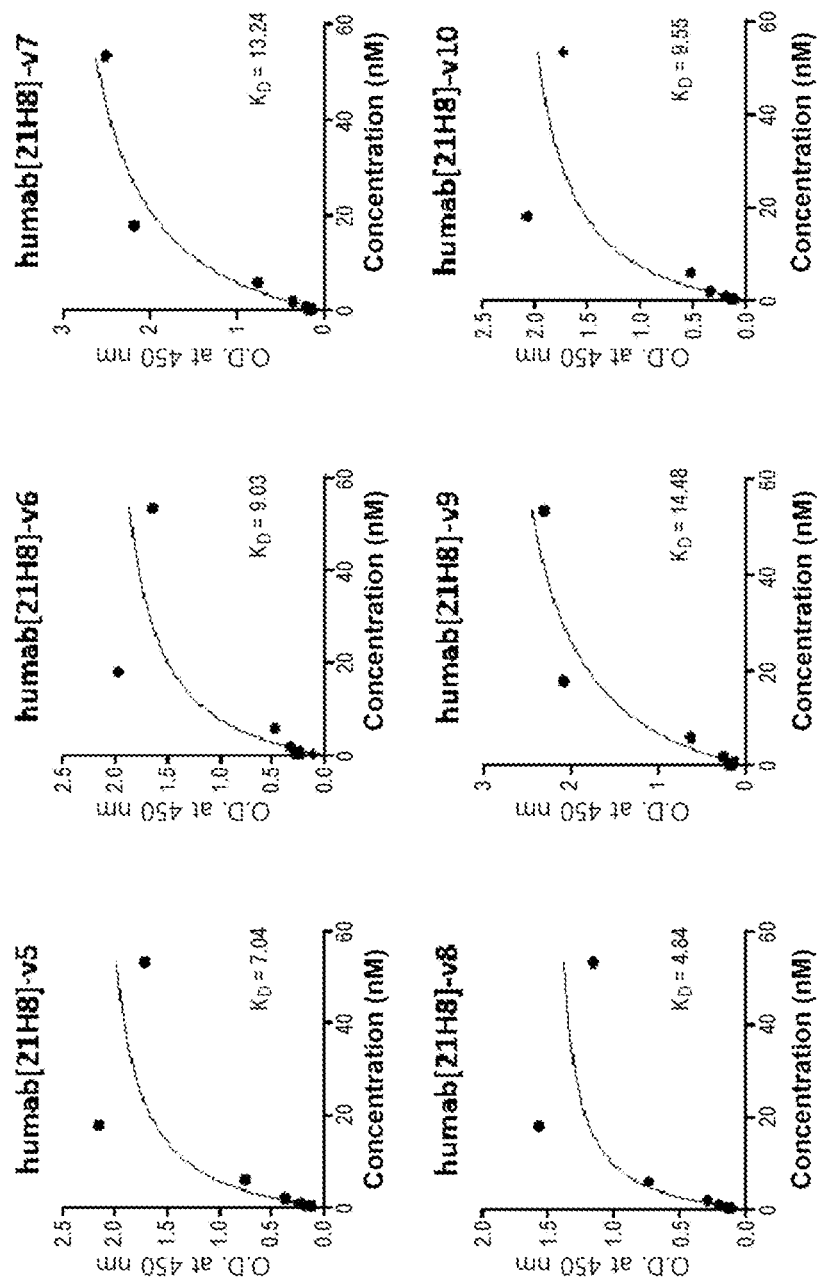
Figure 1C:
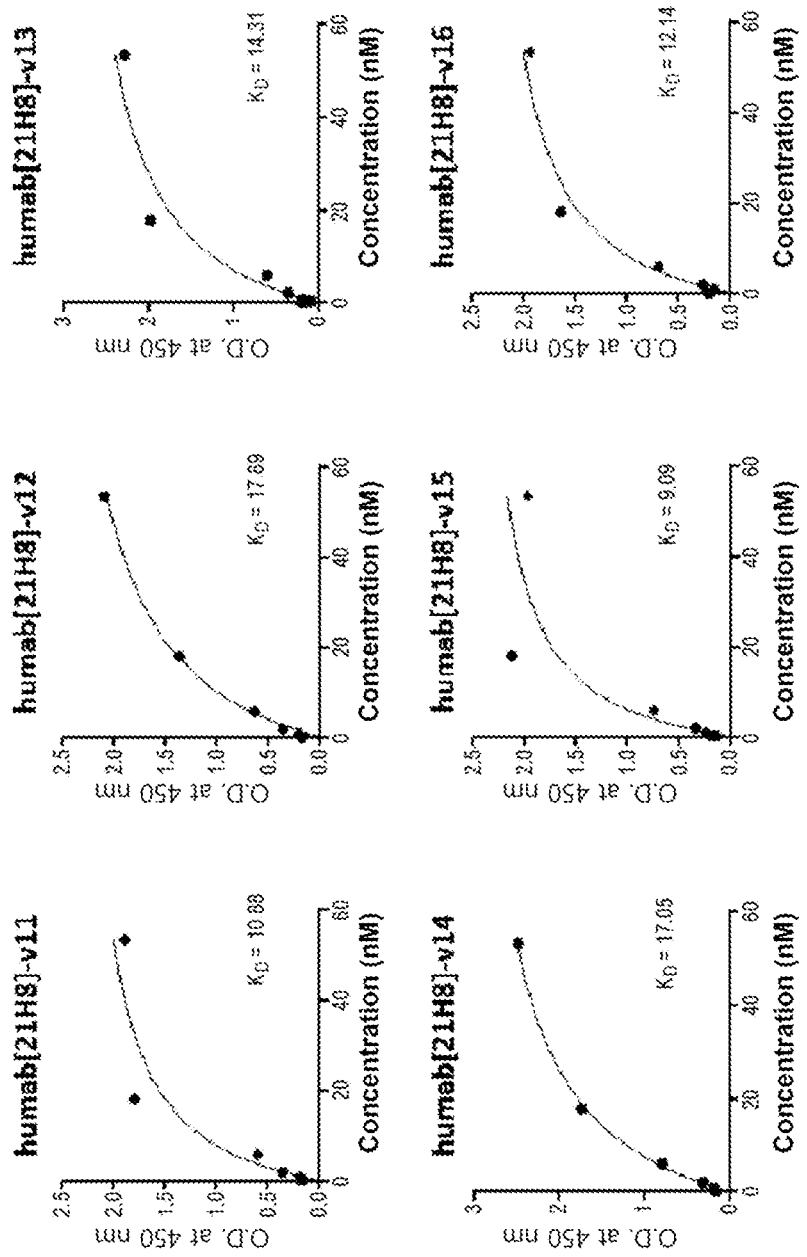

The results are summarized in FIG. 1 (FIGS. 1a to 1c) and Table 3 below.

TABLE 3

|  | mAb [21H8] | chimeric[21H8] | humab [21H8]-v1 | humab [21H8]-v2 | humab [21H8]-v3 | humab [21H8]-v4 | humab [21H8]-v5 | humab [21H8]-v6 | humab [21H8]-v7 |
|---|---|---|---|---|---|---|---|---|---|
| $K_D$ value (nM) | 28.42 | 11.21 | 5.75 | 8.99 | 6.77 | 7.21 | 7.04 | 9.03 | 13.24 |

|  | humab [21H8]-v8 | humab [21H8]-v9 | humab [21H8]-v10 | humab [21H8]-v11 | humab [21H8]-v12 | humab [21H8]-v13 | humab [21H8]-v14 | humab [21H8]-v15 | humab [21H8]-v16 |
|---|---|---|---|---|---|---|---|---|---|
| $K_D$ value (nM) | 4.84 | 14.48 | 9.55 | 10.88 | 17.89 | 14.31 | 17.05 | 9.09 | 12.14 |

\* $K_D$: Equilibrium dissociation constant (the smaller the value, the greater the binding affinity of the ligand to the target)

As can be seen from the above experiments, it was found that the binding ability of the humanized antibody was significantly improved. For example, it was found that humab [21H8]-v1 had about 5 times stronger binding force than mAb [21H8], and humab [21H8]-v3 had about 3 times stronger binding force. In particular, it was confirmed that the binding force of humab [21H8]-v8 was about 6 times stronger than that of mAb [21H8].

The purpose of humanizing antibodies from other animals is to reduce immunogenicity in the human body, and in general, the binding force is lowered in the process. The humanized antibodies of the present invention showed exceptional properties with better avidity than mouse antibodies. This is because the mouse antibody used as the main antibody in the present invention was not subjected to an avidity optimization process, so it seems that the avidity was increased in the process of humanization and optimization. Accordingly, in the present invention, antibodies that were unexpectedly humanized but had rather excellent antigen-binding ability were obtained.

Example 3. Preparation of Complex (Doligobody) Containing Anti-Digoxigenin Antibody Example 3-1. Preparation of Digoxigenin-Aptamer-MMAE Conjugate (DOligomer)

As the aptamer, aptamer SQ7-1 (8) (SEQ ID NO: 11) that binds to pancreatic cancer cells was used. A conjugate was prepared by linking digoxigenin to the 5' end of the aptamer and monomethyl auristatin E (MMAE) to the 3' end. The specific manufacturing method is as follows.

An aptamer with digoxigenin bound to the 5' end and S-S modified at the 3' end was synthesized and provided by Integrated DNA Technology (IDT; USA).

In order to cut off the 3' thiol C3 S-S linker of the aptamer, 0.1 M TEAA (Triethylammonium acetate) and 1 mM TCEP (Tris-(2-carboxyethyl) phosphine hydrochloride) were added and reacted at 70° C. for 5 minutes and then at room temperature for 2 hours. Residual TCEP was removed with PBS and 2 mM EDTA (Ethylenediaminetetraacetic acid) using Amicon Ultra 3K spin columns (Milipore, Billerica, MA).

The DIG-aptamer and MC-Val-Cit-PAB-MMAE (Levena Biopharma, San Diego, CA) at 5 times the concentration (molar) of the aptamer was reacted at room temperature for 16 hours. Then, residual MMAE was removed with PBS using Amicon Ultra 3K spin columns (Milipore, Billerica, MA).

The synthesized digoxigenin-aptamer-MMAE was analyzed by using a reversed-phase analytical HPLC on a 4.6×50 mm Xbridge C18 column (Waters, Milford, MA) and using e2695 (Waters, USA) high-performance liquid chromatography (HPLC) instrument, and detected at 260 nm by using a UV detector (Waters, USA).

During the analysis, the column temperature was maintained at 65° C., and 0.1 M TEAA at pH 7.0 (eluent A) and Acetonitrile (eluent B) were used as the mobile phase. Analysis conditions were 90% A and 10% B flowed from the beginning to 5 minutes, then eluent B was flowed at 1 mL/minute in a linear gradient from 20 to 70% for 5-15 minutes.

As a result of analysis by injecting 30 μM of DIG-SQ7-1(8)-SH aptamer in a volume of 10 μL, the peak was confirmed at the retention time of 6.21 minutes, and as a result of analysis by injecting 30 μM of DOligomer prepared above in 10 μL volume, the peak was confirmed at the retention time of 10.02 minutes. This means that the synthesis between MC-Val-Cit-PAB-MMAE (Levena Biopharma, San Diego, CA) and DIG-SQ7-1(8)-SH was well done, and it was confirmed that digoxigenin-aptamer-MMAE (DIG-SQ7-1(8)-MMAE) conjugate was synthesized with a purity of 98%.

Example 3-2. Preparation of DIG-Aptamer-MMAE Conjugate and Anti-Digoxigenin Humanized Antibody Complex (DOligobody)

A complex (DOligobody) was prepared by combining mouse antibody prepared in Example 1 (mAb [21H8]), chimeric antibody (chimeric [21H8]), humanized antibody (humab [21H8]-v1, humab [21H8]-v2, humab [21H8]-v3, humab [21H8]-v4, humab [21H8]-v5, humab [21H8]-v6, humab [21H8]-v7, humab [21H8]-v8, humab [21H8]-v9, humab [21H8]-v10, humab [21H8]-v11, humab [21H8]-v12, humab [21H8]-v13, humab [21H8]-v14, humab [21H8]-v15, humab [21H8]-v16) and DIG prepared in Example 3-1 A complex (DOligobody) with the DIG-aptamer-MMAE conjugate (DOligomer) prepared in Example 3-1.

Specifically, 250 nM of the DIG-aptamer-MMAE conjugate and 125 nM of the antibody prepared in Example 1 were dissolved in binding buffer (DPBS (Hyclone #SH30028.02) in 0.1% BSA (Merk #126593), 0.1 mg/ml yeast tRNA (Sigma #R9001), and 5 mM $MgCl_2$ (including Biosesang #M3101)) to a total volume of 100 μL. The mixture was incubated on a rotator at room temperature for 30 minutes to bind the antibody and the DIG-aptamer-MMAE conjugate to prepare a complex (DOligobody). The structure of the DOligobody thus prepared is as disclosed in FIG. 2.

Example 3-3. Confirmation of Binding Ability of Anti-Digoxigenin Humanized Antibody-Containing Complex (DOligobody) Through FACS Experiments The binding ability of the complex (DOligobody) prepared in Example 3-2 was confirmed using CFPAC-1, a human pancreatic cancer cell line targeted by the aptamer SQ7-1(8) contained therein. This was measured using a flow cytometer (FACS, Fluorescence-activated cell sorting). Since it was the aptamer in the conjugate that had binding ability to pancreatic cancer cells, and FACS was analyzed using a secondary antibody for anti-digoxigenin antibody (mouse or human), through this result, it was confirmed that the complex (DOligobody) of the present invention in which the conjugate of DIG-aptamer-MMAE and the anti-digoxigenin antibody were bound was normally produced.

Specifically, CFPAC-1 cells were obtained by trypsinization, and prepared in a round bottom tube at a cell concentration of $3\times10^5$. 100 μL of the complex (DOligobody) mixture prepared in Example 3-2 was added to each tube, and incubated at 4° C. for 30 minutes.

Thereafter, the cells in the tube were washed three times with 500 μL of a washing buffer (including Binding buffer of Example 3-2+0.1% $NaN_3$).

A secondary antibody was attached to the washed cells. Specifically, Alexa Fluor™ 488 anti-mouse IgG (H+L) (Invitrogen #A21202) prepared from donkey was diluted 1/500, and Anti-Human IgG (Fc specific)-FITC antibody (Sigma #F9512) prepared from goat was diluted 1/500 and treated, and incubated at 4° C. for 15 minutes.

Thereafter, the cells in the tube were washed three times with 500 μL of a washing buffer (including Binding buffer of Example 3-2+0.1% $NaN_3$).

Samples for FACS were prepared by treating the washed cells with a solution in which 7-AAD (BD Pharmingen™ #559925: 1/100 dilution) was added to 300 μl of binding buffer.

The prepared samples were analyzed using a FACS-Verse™ (BD Biosciences, San Jose, USA) instrument. The analysis results are shown in FIG. 3 (FIGS. 3a to 3c).

Based on the FACS result, the result of comparing the binding rate of DOligobody, which is a complex of the present invention, was shown in FIG. 4. According to the results, it was confirmed that the binding rate of the complex to CFPAC-1, a human pancreatic cancer cell line, was better when the humanized antibody was bound to the DIG-aptamer-MMAE conjugate than when the original mouse antibody was bound to the DIG-aptamer-MMAE conjugate. In particular, in the case of humanized antibodies such as humab [21H8]-v6, etc., it was confirmed that the binding rate of the complex to cancer cells was superior to that of the chimeric antibody. This shows that the difference in binding ability between the digoxigenin-aptamer-MMAE conjugate and the anti-digoxigenin antibody also affects the binding ability of the entire complex to pancreatic cancer cells. That is, since the binding force of mouse and chimeric antibodies to the conjugate is weaker than that of humanized antibodies, the binding force with pancreatic cancer cells targeted by the aptamer in the conjugate seems to be weaker.

Example 4. Pharmacokinetics of DOligobody Complex Containing Anti-Digoxigenin Antibody The pharmacokinetic analysis of the complex (Doligobody) containing the digoxigenin antibody was performed through animal experiments. In Balb/c mice 1) DIG-SQ7-1 (8)-MMAE conjugated DOligomer (control), 2) DOligobody containing humab[21H8]-v5 antibody, 3) DOligobody containing humab[21H8]-v6 antibody, or 4) DOligobody containing humab[21H8]-v8 antibody was administered at 8 mg/kg. At the time of administration, about 50 to 100 μL of blood was collected from the orbital vein using a heparin-coated capillary tube at 0.5 hour, 1 hour, 4 hour, 8 hour, 12 hour, 24 hour, 48 hour, and 72 hour after administration.

After the collected blood was left on ice for 30 minutes, the supernatant (plasma) was separated through centrifugation, and the concentration of aptamer and humanized antibody in the blood was analyzed using digoxigenin ELISA and human IgG ELISA kits.

※ Digoxigenin ELISA Method
1) Anti-digoxigenin (Abcam, cat. Ab420) at a concentration of 2 μg/mL (100 μl each) was plated on Immuno Clear plate (Thermo Scientific™, Cat. No. 468667), 4° C., overnight.
2) After washing three times with PBS+0.05% Tween-20 (PBS-T) (150 μL), blocking with 100 μL 3% BSA (Calbiochem®, Cat. No. 126609) at 37° C. for 1 hour.
3) After removing the blocking solution, 50 μl of each 1/10 diluted blood sample was incubated at 37° C. for 1 hour.
4) After washing three times with PBS-T (150 μL), incubating with 50 μL HRP-conjugated digoxigenin (1/4000 dilution) at 37° C. for 1 hour.
5) After washing three times with PBS-T (150 μL), 100 μL of 1-Step™ Ultra TMB-ELISA Substrate (Thermo Fisher Scientific, Cat. No. 34029) was added and incubated for 15 minutes.
6) Added 2.5 $NH_2SO_4$ (40 μL).
7) OD value measured at 450 nm absorbance using Synergy™ H1 Hybrid Multi-Mode Reader (BioTek).

※ Human IgG ELISA Method
The experiment was conducted according to the manual of Human IgG total ELISA Kit (Invitrogen, Cat. BMS2091). Specifically, it is as follows:
1) Blood samples were diluted 1/10,000 with assay dilution buffer.
2) Standard was prepared by serial dilution with assay dilution buffer to 0.2, 0.1, 0.05, 0.025, 0.013, and 0.003 μg/mL.
3) HRP-conjugate was diluted 1/100 with assay dilution buffer.
4) Washed the plate once with wash buffer.
5) 100 μL of blood sample diluent or standard and 100 μL of HRP-conjugate was added to each well and reacted at room temperature for 1.5 hour.
6) Washed 4 times with wash buffer
7) 100 μL of TMB substrate was added and reacted at room temperature for 30 minutes.
8) After adding 100 μL of the stop solution, the OD value was measured at 450 nm absorbance using Synergy™ H1 Hybrid Multi-Mode Reader (BioTek).

As a result of the analysis through the above experiment, PK graph for digoxigenin was confirmed as shown in FIG. 6. Meanwhile, the plasma concentration of antibody after intravenous administration was divided into distribution phase and elimination phase, and its half-life (t½) was calculated. It was confirmed that 1) the half-life of DIG-SQ7-1(8)-MMAE conjugate DOligomer (control) was only 0.02 hours, 2) that of DOligobody containing humab [21H8]-v5 antibody was 9.2 hours, 3) that of DOligobody containing humab [21H8]-v6 antibody was 16.8 hours, and 4) that of humab [21H8] DOligobody containing]-v8 antibody was 38.5 hours (FIG. 7).

The PK graph for human IgG was shown in FIG. 8. According to the result of calculating the half-life (t½) for DOligobody including humab [21H8]-v5 antibody, humab [21H8]-v6 antibody, and humab [21H8]-v8 antibody, 2) the half-life of DOligobody containing humab [21H8]-v5 antibody was 35 hours, 3) that of DOligobody containing humab

[21H8]-v6 antibody was 32 hours, and 4) that of DOligobody containing humab [21H8]-v8 antibody was 143 hours (FIG. 9).

As can be confirmed through the above data, it was confirmed that the DOligobody of the present invention significantly increased the half-life in vivo.

Through the above experiments, it was confirmed that the use of the complex (DOligobody) comprising the anti-digoxigenin antibody of the present invention and the conjugate (DOligomer) composed of the digoxigenin-aptamer-drug as a carrier can increase targeting of the drug to target cells and increase the half-life of the drug in the body.

A person skilled in the art can effectively deliver the drug into the body by appropriately selecting an aptamer that binds to a target cell or substance and selecting a drug to be delivered by using the complex (DOligobody) of the present invention as a drug delivery system.

From the above description, those skilled in the art to which the present invention pertains will be able to understand that the present invention may be implemented in other specific forms without changing the technical spirit or essential features of the present invention. In this regard, it should be understood that the embodiments described above are illustrative in all respects and not limiting. The scope of the present invention should be construed as including all changes or modifications derived from the meaning and scope of the following claims and their equivalent concepts rather than the detailed description above.

---

The invention claimed is:

1. An anti-digoxigenin humanized antibody or antigen-binding fragment thereof that specifically binds to digoxigenin comprising:
a heavy chain variable region including an amino acid sequence selected from the group consisting of SEQ ID NOs: 2 to 5; and a light chain variable region including an amino acid sequence selected from the group consisting of SEQ ID NOs: 7 to 10.

2. The anti-digoxigenin humanized antibody or antigen-binding fragment thereof according to claim 1, wherein the anti-digoxigenin humanized antibody or antigen-binding fragment thereof is one of the following:
a) an anti-digoxigenin humanized antibody or antigen-binding fragment thereof comprising a heavy chain variable region including the amino acid sequence of SEQ ID NO: 2; and a light chain variable region including the amino acid sequence of SEQ ID NO: 7;
b) an anti-digoxigenin humanized antibody or antigen-binding fragment thereof comprising a heavy chain variable region including the amino acid sequence of SEQ ID NO: 3; and a light chain variable region including the amino acid sequence of SEQ ID NO: 7;
c) an anti-digoxigenin humanized antibody or antigen-binding fragment thereof comprising a heavy chain variable region including the amino acid sequence of SEQ ID NO: 4; and a light chain variable region including the amino acid sequence of SEQ ID NO: 7;
d) an anti-digoxigenin humanized antibody or antigen-binding fragment thereof comprising a heavy chain variable region including the amino acid sequence of SEQ ID NO: 5; and a light chain variable region including the amino acid sequence of SEQ ID NO: 7;
e) an anti-digoxigenin humanized antibody or antigen-binding fragment thereof comprising a heavy chain variable region including the amino acid sequence of SEQ ID NO: 2; and a light chain variable region including the amino acid sequence of SEQ ID NO: 8;
f) an anti-digoxigenin humanized antibody or antigen-binding fragment thereof comprising a heavy chain variable region including the amino acid sequence of SEQ ID NO: 3; and a light chain variable region including the amino acid sequence of SEQ ID NO: 8;
g) an anti-digoxigenin humanized antibody or antigen-binding fragment thereof comprising a heavy chain variable region including the amino acid sequence of SEQ ID NO: 4; and a light chain variable region including the amino acid sequence of SEQ ID NO: 8;
h) an anti-digoxigenin humanized antibody or antigen-binding fragment thereof comprising a heavy chain variable region including the amino acid sequence of SEQ ID NO: 5; and a light chain variable region including the amino acid sequence of SEQ ID NO: 8;
i) an anti-digoxigenin humanized antibody or antigen-binding fragment thereof comprising a heavy chain variable region including the amino acid sequence of SEQ ID NO: 2; and a light chain variable region including the amino acid sequence of SEQ ID NO: 9;
j) an anti-digoxigenin humanized antibody or antigen-binding fragment thereof comprising a heavy chain variable region including the amino acid sequence of SEQ ID NO: 3; and a light chain variable region including the amino acid sequence of SEQ ID NO: 9;
k) an anti-digoxigenin humanized antibody or antigen-binding fragment thereof comprising a heavy chain variable region including the amino acid sequence of SEQ ID NO: 4; and a light chain variable region including the amino acid sequence of SEQ ID NO: 9;
l) an anti-digoxigenin humanized antibody or antigen-binding fragment thereof comprising a heavy chain variable region including the amino acid sequence of SEQ ID NO: 5; and a light chain variable region including the amino acid sequence of SEQ ID NO: 9;
m) an anti-digoxigenin humanized antibody or antigen-binding fragment thereof comprising a heavy chain variable region including the amino acid sequence of SEQ ID NO: 2; and a light chain variable region including the amino acid sequence of SEQ ID NO: 10;
n) an anti-digoxigenin humanized antibody or antigen-binding fragment thereof comprising a heavy chain variable region including the amino acid sequence of SEQ ID NO: 3; and a light chain variable region including the amino acid sequence of SEQ ID NO: 10;
o) an anti-digoxigenin humanized antibody or antigen-binding fragment thereof comprising a heavy chain variable region including the amino acid sequence of SEQ ID NO: 4; and a light chain variable region including the amino acid sequence of SEQ ID NO: 10, and p) an anti-digoxigenin humanized antibody or antigen-binding fragment thereof comprising a heavy chain variable region including the amino acid sequence of SEQ ID NO: 5; and a light chain variable region including the amino acid sequence of SEQ ID NO: 10.

3. The anti-digoxigenin humanized antibody or antigen-binding fragment thereof according to claim 1, wherein the anti-digoxigenin humanized antibody is in the form of IgG1, IgG2, IgG3 or IgG4.

4. The anti-digoxigenin humanized antibody or antigen-binding fragment thereof according to claim 1, wherein the antigen-binding fragment of the antibody is selected from the group consisting of scFv, (scFv)$_2$, scFv-Fc, Fab, Fab' and F(ab')$_2$.

* * * * *